(12) United States Patent
Kurosumi

(10) Patent No.: US 11,385,617 B2
(45) Date of Patent: Jul. 12, 2022

(54) DIAGNOSTIC APPARATUS AND DIAGNOSTIC METHOD

(71) Applicant: FANUC CORPORATION, Yamanashi (JP)

(72) Inventor: Yasuhiko Kurosumi, Yamanashi (JP)

(73) Assignee: FANUC CORPORATION, Yamanashi (JP)

(\*) Notice: Subject to any disclaimer, the term of this patent is extended or adjusted under 35 U.S.C. 154(b) by 199 days.

(21) Appl. No.: 16/995,161

(22) Filed: Aug. 17, 2020

(65) Prior Publication Data

US 2021/0096531 A1 Apr. 1, 2021

(30) Foreign Application Priority Data

Sep. 30, 2019 (JP) .............................. JP2019-180670

(51) Int. Cl.
*G05B 19/4065* (2006.01)
*G05B 23/02* (2006.01)

(52) U.S. Cl.
CPC ..... *G05B 19/4065* (2013.01); *G05B 23/0221* (2013.01); *G05B 2219/50276* (2013.01); *G05B 2219/50308* (2013.01)

(58) Field of Classification Search
None
See application file for complete search history.

(56) References Cited

FOREIGN PATENT DOCUMENTS

JP 2018-156652 10/2018

*Primary Examiner* — Carlos R Ortiz Rodriguez
(74) *Attorney, Agent, or Firm* — Wenderoth, Lind & Ponack, LLP.

(57) ABSTRACT

A diagnostic apparatus includes a context information acquisition unit that acquires context information of operation being performed from a plurality of mechanical apparatuses, a sensing information acquisition unit that acquires physical quantity sensing information sensed by each of sensing units of a target machine and other mechanical apparatuses, a sensing information separation unit that separates the physical quantity information of the target machine and the physical quantity information of the other mechanical apparatuses from each other based on the context information and the sensing information of each of the plurality of mechanical apparatuses, a feature information extraction unit that extracts feature information of the physical quantity information, and an anomaly determination unit that determines, from a model corresponding to the acquired context information and the extracted feature information, whether or not operation of the target machine is normal.

17 Claims, 17 Drawing Sheets

DIAGNOSTIC APPARATUS AND DIAGNOSTIC METHOD

This application is based on and claims the benefit of priority from Japanese Patent Application No. 2019-180670, filed on 30 Sep. 2019, the content of which is incorporated herein by reference.

BACKGROUND OF THE INVENTION

Field of the Invention

The present invention relates to a diagnostic apparatus and a diagnostic method.

Related Art

The technique of sensing a physical quantity of vibration, sound, etc. due to operation of an industrial apparatus or a peripheral apparatus to sense an anomaly in operation of the industrial apparatus or the peripheral apparatus or an anomaly in a tool etc. placed in the industrial apparatus has been known. See Patent Document 1, for example.

Patent Document 1: Japanese Unexamined Patent Application, Publication No. 2018-156652

SUMMARY OF THE INVENTION

It is rare that a single industrial apparatus is placed in a building of a factory. In many cases, a plurality of mechanical apparatuses including an industrial apparatus and a peripheral apparatus are placed in the same building. For this reason, a sensing unit arranged in the mechanical apparatus (hereinafter also referred to as a "target machine") targeted for diagnosis, such as a vibration sensor, detects not only a physical quantity of vibration etc. from the target machine itself but also a physical quantity of vibration etc. from other mechanical apparatuses.

Thus, it has been demanded that physical quantity sensing information detected by the sensing unit of the target machine is separated into the physical quantity from the target machine itself and the physical quantities from the other mechanical apparatuses to sense an anomaly in the target machine with high accuracy.

(1) One aspect of a diagnostic apparatus of the present disclosure relates to a diagnostic apparatus connected to a plurality of mechanical apparatuses including an industrial apparatus and a peripheral apparatus. The diagnostic apparatus includes a context information acquisition unit that acquires, from each of the plurality of mechanical apparatuses, context information corresponding to operation being performed among a plurality of pieces of context information set based on the type of operation of each of the plurality of mechanical apparatuses; a sensing information acquisition unit that acquires, as sensing information sensed by sensing units arranged in a target machine as a mechanical apparatus targeted for diagnosis and other mechanical apparatuses, a physical quantity of each of the target machine and the other mechanical apparatuses, the physical quantity changing according to operation of each of the target machine and the other mechanical apparatuses; a sensing information separation unit that separates physical quantity information indicating the physical quantity of the target machine and physical quantity information indicating the physical quantities of the other mechanical apparatuses from each other based on the context information of each of the plurality of mechanical apparatuses acquired by the context information acquisition unit and the sensing information of each of the target machine and the other mechanical apparatuses acquired by the sensing information acquisition unit; a feature information extraction unit that extracts feature information indicating the feature of the physical quantity information in an interval including a specific operation interval indicated by the context information of the target machine from the physical quantity information of the target machine separated by the sensing information separation unit; and an anomaly determination unit that determines, based on a model corresponding to the context information acquired by the context information acquisition unit among one or more models corresponding to one or more pieces of context information and the feature information extracted by the feature information extraction unit, whether or not operation of the target machine is normal.

(2) One aspect of a diagnostic method of the present disclosure relates to the diagnostic method for diagnosing a plurality of mechanical apparatuses including an industrial apparatus and a peripheral apparatus. The diagnostic method is realized by a computer and includes the context information acquisition step of acquiring, from each of the plurality of mechanical apparatuses, context information corresponding to operation being performed among a plurality of pieces of context information set based on the type of operation of each of the plurality of mechanical apparatuses; the sensing information acquisition step of acquiring, as sensing information sensed by sensing units arranged in a target machine as a mechanical apparatus targeted for diagnosis and other mechanical apparatuses, a physical quantity of each of the target machine and the other mechanical apparatuses, the physical quantity changing according to operation of each of the target machine and the other mechanical apparatuses; the sensing information separation step of separating physical quantity information indicating the physical quantity of the target machine and physical quantity information indicating the physical quantities of the other mechanical apparatuses from each other based on the context information of each of the plurality of mechanical apparatuses acquired at the context information acquisition step and the sensing information of each of the target machine and the other mechanical apparatuses acquired at the sensing information acquisition step; the feature information extraction step of extracting feature information indicating the feature of the physical quantity information in an interval including a specific operation interval indicated by the context information of the target machine from the physical quantity information of the target machine separated at the sensing information separation step; and the anomaly determination step of determining, based on a model corresponding to the context information acquired at the context information acquisition step among one or more models corresponding to one or more pieces of context information and the feature information extracted at the feature information extraction step, whether or not operation of the target machine is normal.

According to one aspect, the physical quantity sensing information detected by the sensing unit of the target machine can be separated into the physical quantity from the target machine itself and the physical quantities from the other mechanical apparatuses to sense an anomaly in the target machine with high accuracy.

DETAILED DESCRIPTION OF THE INVENTION

One Embodiment

First, the outline of the present embodiment will be described. In the present embodiment, a diagnostic apparatus acquires, from each of a plurality of mechanical apparatuses, context information corresponding to operation being performed among a plurality of pieces of context information set based on the type of operation of each of the plurality of mechanical apparatuses. Moreover, the diagnostic apparatus acquires, as sensing information sensed by sensing units arranged in a target machine and other mechanical apparatuses, a physical quantity of each of the target machine and the other mechanical apparatuses, the physical quantity changing according to operation of each of the target machine and the other mechanical apparatuses. The diagnostic apparatus separates physical quantity information of the target machine and physical quantity information of the other mechanical apparatuses from each other based on the acquired context information and the sensing information of each of the target machine and the other mechanical apparatuses. The diagnostic apparatus extracts feature information indicating the feature of the physical quantity information in an interval including a specific operation interval indicated by the context information of the target machine, and based on a model corresponding to the acquired context information, determines whether or not operation of the target machine is normal.

With this configuration, according to the present embodiment, it is possible to solve the above-described problem that "separating the physical quantity sensing information detected by the sensing unit of the target machine into the physical quantity from the target machine itself and the physical quantities from the other mechanical apparatuses to sense an anomaly in the target machine with high accuracy".

The outline of the present embodiment has been described above.

Next, a configuration of the present embodiment will be described in detail with reference to the drawings.

Figure 1:
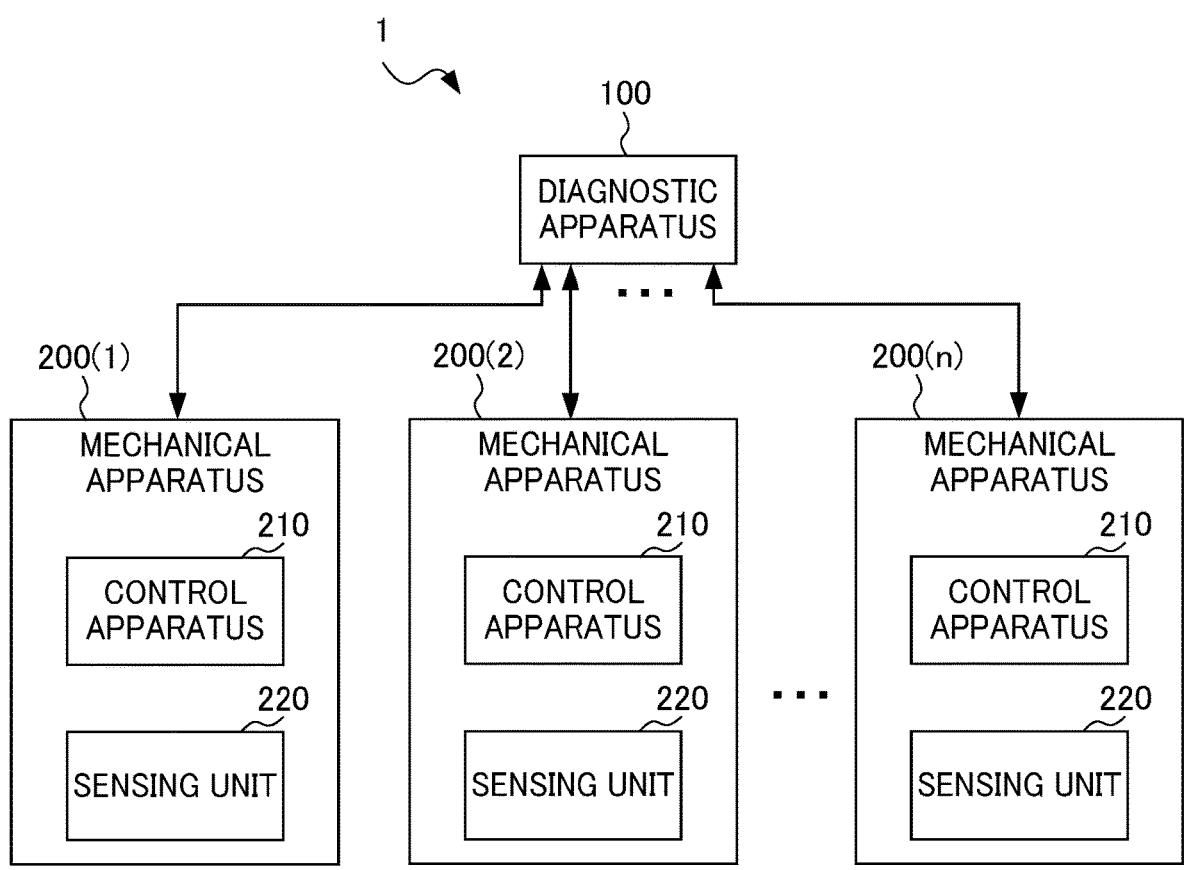
FIG. 1 is a block diagram showing an entire configuration of a diagnostic system 1 according to one embodiment.

FIG. 1 is a block diagram showing an entire configuration of a diagnostic system 1 according to one embodiment. The diagnostic system 1 includes a diagnostic apparatus 100 and n mechanical apparatuses 200(1) to 200(n) (n is an integer of equal to or greater than two).

The diagnostic apparatus 100 and the mechanical apparatuses 200(1) to 200(n) may be directly connected to each other via a not-shown connection interface. Note that the diagnostic apparatus 100 and the mechanical apparatuses 200(1) to 200(n) may be connected to each other via a not-shown network such as a local area network (LAN) or the Internet. In this case, the diagnostic apparatus 100 and the mechanical apparatuses 200(1) to 200(n) include not-shown communication units that perform communication with each other via such connection.

Note that the diagnostic apparatus 100 may be included in a later-described control apparatus 210 included in any of the mechanical apparatuses 200(1) to 200(n).

Hereinafter, in a case where it is not necessary to distinguish the mechanical apparatuses 200(1) to 200(n) from each other, these apparatuses will be also collectively referred to as "mechanical apparatuses 200."

<Mechanical Apparatus 200>

The mechanical apparatus 200 is, for example, a machine tool, a robot, or a peripheral apparatus. Note that the mechanical apparatus 200 is not limited to the machine tool, the robot, or the peripheral apparatus, and can be widely applied to general industrial apparatuses. The industrial apparatuses include, for example, various machines such as a machine tool, an industrial robot, a service robot, a forging press machine, and an injection molding machine.

Moreover, the peripheral apparatuses include delivery apparatuses such as a loader, a feeder, a belt conveyer, an automatic guided vehicle (AGV), a robot, and a crane, and fluid supply apparatuses such as an air compressor and a pump for supplying a cooling medium (including cutting fluid) or a lubricant. Further, the peripheral apparatuses include a heating apparatus, a cooling apparatus, a press machine, a press-fitting apparatus, and a vibration apparatus. In addition, the peripheral apparatuses include chip/emission recovery apparatuses such as a chip conveyer and a mist collector, building temperature/humidity adjustment apparatuses such as an air conditioner, a humidifier, a dehumidifier, and a ventilation apparatus, a lighting apparatus, and a display apparatus.

Moreover, as shown in FIG. 1, the mechanical apparatus 200 has a control apparatus 210 and a sensing unit 220.

The control apparatus 210 is a numerical value control apparatus well-known by those skilled in the art, and generates an operation command based on control information to output the generated operation command to the mechanical apparatus 200. With this configuration, the control apparatus 210 controls operation of the mechanical apparatus 200. Note that in a case where the mechanical apparatus 200 is, e.g., the robot, the control apparatus 210 may be, e.g., a robot control apparatus.

Moreover, the control apparatus 210 transmits, to the diagnostic apparatus 100, context information corresponding to operation being performed among a plurality of pieces of context information set based on the type of operation of the mechanical apparatus 200.

The context information described herein is a plurality of pieces of information each set for the types of operation of the mechanical apparatus 200. The context information is, for example, information indicating identification information of the mechanical apparatus 200, identification information (e.g., tool identification information) of a drive unit (not shown) included in the mechanical apparatus 200, configuration information such as the diameter of a tool to be driven by the not-shown drive unit and the material of the tool, and information of processing conditions such as an operation state of the tool to be driven by the not-shown drive unit, cumulative use time after the start of use of the not-shown drive unit, a load on the not-shown drive unit, the number of rotations of the not-shown drive unit, and the processing speed of the not-shown drive unit.

Note that these types of context information include, as the information indicating the operation state of the tool to be driven by the not-shown drive unit, an ON/OFF signal (hereinafter also referred to as a "ladder signal") indicating an interval until the end of actual processing after the operation of feeding the tool to a processing target, for example. For example, in the case of the press machine as the peripheral apparatus having great influence on noise, the mechanical apparatus 200 outputs, as part of the context information, the ladder signal as the ON/OFF signal indicating an operation status of the press machine.

Moreover, the context information may include an apparatus parameter of the mechanical apparatus 200 and operator information of a person responsible for a change in a set value such as a set temperature.

Further, the context information may include maintenance information of the mechanical apparatus 200. The maintenance information may include, for example, the records of replacement of parts (including consumables such as a tool and a filter), the records of replacement of the cutting fluid (coolant)/the records of adjustment of the concentration, pH, etc. of the cutting fluid/the records of refilling of the cutting fluid, and the records of leveling of the mechanical apparatus 200 and adjustment of various types of accuracy, etc. of the mechanical apparatus 200. Moreover, the maintenance information may include the records (including the records of operation of an oil pump for automatic supply) of supply of the lubricant such as lubricant oil or grease, the records of cleaning of deposited chips, cutting fluid contamination, lubricant oil contamination, clogs in a cutting fluid supply apparatus, etc., and maintenance information (including cleaning) of building air supply equipment, a temperature adjustment machine, and a ventilation apparatus.

The sensing unit 220 senses, for example, a physical quantity of vibration or sound generated due to contact between the tool placed in the mechanical apparatus 200, such as a drill, an end mill, a bit tip, or a grinding stone, and the processing target during the processing or a physical quantity of vibration or sound generated by the tool itself or the mechanical apparatus 200 itself. At the same time, the sensing unit 220 also senses, for example, a physical quantity of vibration or sound generated due to contact among the tools placed in other mechanical apparatuses 200, such as drills, end mills, bit tips, or grinding stones, and the processing targets during the processing or a physical quantity of vibration or sound generated by the tools of the other mechanical apparatuses 200 themselves or the other mechanical apparatuses 200 themselves. The sensing unit 220 outputs, as sensing information in the mechanical apparatus 200, these sensed physical quantities to the diagnostic apparatus 100.

Note that the number of sensing units 220 is optional. For example, a plurality of sensing units 220 that sense the same physical quantity may be placed, or a plurality of sensing units 220 that sense different physical quantities may be placed.

For example, in the case of sensing the physical quantity of vibration or sound, a strain gauge, an acceleration sensor, a pressure sensor, a laser Doppler vibrometer, or a sound collection apparatus (a microphone) can be used as the sensing unit 220. Moreover, in the case of sensing a physical quantity of temperature, a thermocouple, a thermistor, a radiation thermometer, etc. can be used as the sensing unit 220. In the case of sensing a physical quantity of humidity, a hygrometer etc. can be used as the sensing unit 220. Further, in the case of sensing a physical quantity of electric field intensity/distribution, an electric field sensor etc. can be used as the sensing unit 220. In the case of sensing a physical quantity of magnetic field intensity/distribution, a magnetic sensor, a magnetic field sensor, etc. can be used as the sensing unit 220.

In addition, in the case of sensing a physical quantity of current, voltage, power, or electric resistance, an ammeter, a voltmeter, a power meter, or an electric resistance meter can be used as the sensing unit 220. Moreover, in the case of sensing a physical quantity of light or electromagnetic wave intensity/distribution/spectrum, a light sensor, an image sensor, a gaussmeter, etc. can be used as the sensing unit 220. Further, in the case of sensing a physical quantity of a chemical change quantity (e.g., pH, odor, or gas/ion concentration), a pH concentration meter, an odor sensor, a gas sensor, an ion concentration meter, etc. can be used as the sensing unit 220.

Sensing units 220 directly placed in a building where the mechanical apparatuses 200 are arranged may be used as these sensing units 220 other than those placed in the mechanical apparatuses 200. For example, the physical quantity may be sensed using the sound collection apparatus placed in a building of a factory.

Note that the sensing unit 220 may be a non-contact sensor other than a contact sensor. The non-contact sensing unit 220 as described herein includes, for example, a microphone or a laser Doppler vibrometer in the case of sound or vibration, and includes a radiation thermometer or a thermography in the case of temperature.

For example, in a case where the mechanical apparatus 200 is the robot or an automatic delivery apparatus, the non-contact sensing unit 220 is arranged at a mobile section such as an arm or a hand of the robot or the automatic delivery apparatus so that the position and sensing direction of the sensing unit 220 can be changed. With this configuration, the non-contact sensing unit 220 can also sense the physical quantity at such a location that the contact sensing unit 220 cannot be arranged.

Figure 2:
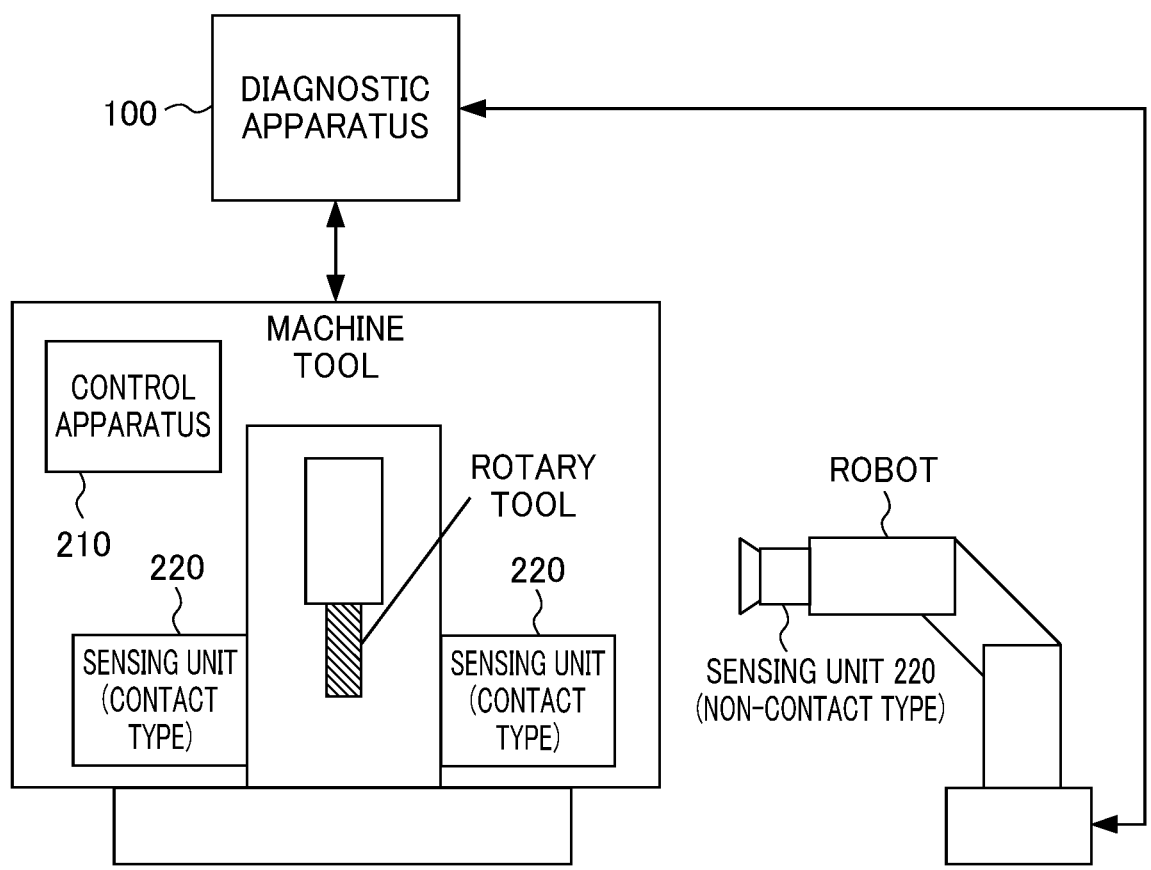
FIG. 2 is a diagram showing one example where physical quantity information of a mechanical apparatus is acquired using a non-contact sensing unit.

Assuming that the machine tool is one example of a target machine 200(1), FIG. 2 shows one example where physical quantity information of the machine tool is acquired using the non-contact sensing unit 220 arranged at a tip end of the robot. For example, in the case of acquiring the physical quantity information of a tip end of a rotary tool of the machine tool, no contact sensing unit 220 can be attached to the rotary tool. On the other hand, in the example of FIG. 2, the robot changes the orientation thereof such that the non-contact sensing unit 220 faces the above-described rotary tool tip end, and in this manner, vibration information of the rotary tool tip end can be acquired.

Moreover, the same non-contact sensing unit 220 can also sense physical quantities (e.g., vibration of the mechanical apparatus 200 itself) other than those in the vicinity of the tool and physical quantities (e.g., floor vibration) other than those of a main body of the mechanical apparatus 200.

With this configuration, the non-contact sensing unit 220 is arranged in the mechanical apparatus 200 such as the robot or the automatic delivery apparatus so that the number of steps and a cost in the process of changing the installation location of the sensing unit 220 can be significantly reduced and anomalous sensing in the target machine 200 can be performed with high accuracy.

Further, the non-contact sensing unit 220 and the mobile section are provided so that the number of steps and the cost in the process of changing the installation location of the sensing unit 220 can be significantly reduced. For example, a stationary sensing unit 220 arranged in the mechanical apparatus 200 and a movable non-contact sensing unit 220 arranged in the mobile section such as the robot simultaneously measure a specific location so that operation of the sensing units 220 can be checked.

Unless otherwise provided, the mechanical apparatus 200(1) will be hereinafter also referred to as a "target machine 200(1)" as a mechanical apparatus targeted for diagnosis. Moreover, the mechanical apparatuses 200(2) to 200(n) will be also referred to as "other mechanical apparatuses 200(k)" (k is an integer of two to n). Note that a case where the other mechanical apparatuses 200(k) are target machines is similar to the case of the target machine 200(1).

<Diagnostic Apparatus 100>

Figure 3:
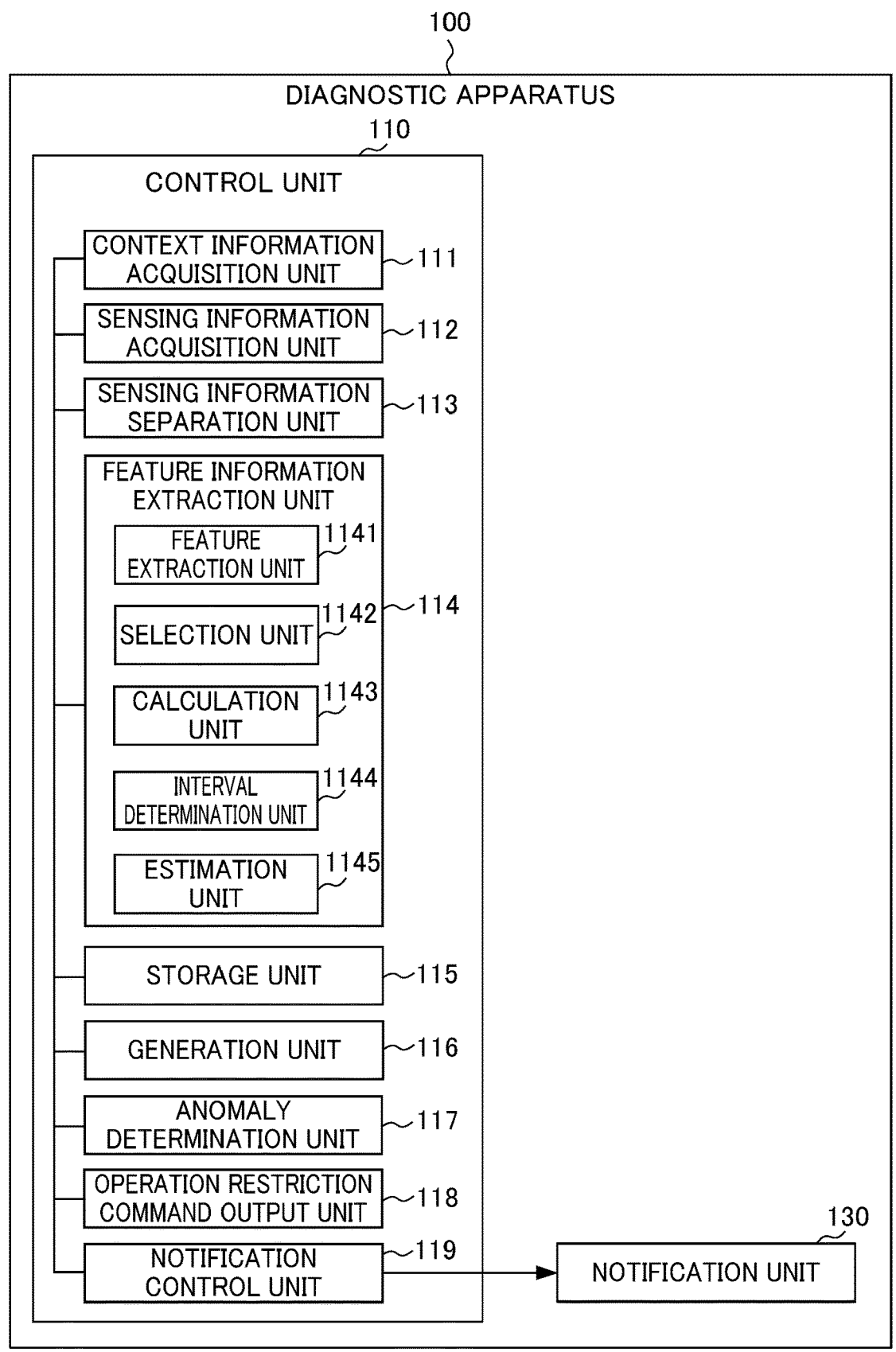
FIG. 3 is a block diagram showing a configuration of a diagnostic apparatus.

As shown in FIG. 3, the diagnostic apparatus 100 has a control unit 110 and a notification unit 130. Further, the control unit 110 has a context information acquisition unit 111, a sensing information acquisition unit 112, a sensing information separation unit 113, a feature information extraction unit 114, a storage unit 115, a generation unit 116, an anomaly determination unit 117, an operation restriction command output unit 118, and a notification control unit 119. In addition, the feature information extraction unit 114 has a feature extraction unit 1141, a selection unit 1142, a calculation unit 1143, an interval determination unit 1144, and an estimation unit 1145.

Note that a notification section of the notification unit 130 is not specifically limited. For example, a notification may be issued in such a manner that, e.g., a warning statement or image data is displayed on the not-shown display apparatus connected to the diagnostic apparatus 100. In addition, a notification may be issued via audio output, or may be issued via signal transmission to a mobile terminal of a user or the mechanical apparatus 200, for example.

The control unit 110 has a CPU, a ROM, a RAM, a CMOS memory, etc., and these components are communicable with each other via a bus and are well-known by those skilled in the art.

The CPU is a processor that controls the diagnostic apparatus 100 as a whole. The CPU reads a system program and an application program stored in the ROM via the bus, thereby controlling the entirety of the diagnostic apparatus 100 according to the system program and the application program. Thus, as shown in FIG. 3, it is configured such that the control unit 110 implements the functions of the context information acquisition unit 111, the sensing information acquisition unit 112, the sensing information separation unit 113, the feature information extraction unit 114, the storage unit 115, the generation unit 116, the anomaly determination unit 117, the operation restriction command output unit 118, and the notification control unit 119. The RAM stores various types of data such as temporary calculation data and notification data. The CMOS memory is backed up by a not-shown battery, and is configured as a non-volatile memory that holds a storage state even when the diagnostic apparatus 100 is powered off.

The context information acquisition unit 111 acquires, from each of the plurality of mechanical apparatuses 200, the context information corresponding to the operation being performed among the plurality of pieces of context information set based on the type of operation of each of the plurality of mechanical apparatuses 200. For example, the cumulative use time of the mechanical apparatus 200 is assumed as the context information to be acquired from the mechanical apparatus 200. In this case, the mechanical apparatus 200 may reset (initialize) the cumulative use time when the tool is replaced, for example.

Note that the context information acquisition unit 111 may receive the input of the context information different from the context information received from the mechanical apparatus 200.

For example, the context information acquisition unit 111 does not acquire the above-described cumulative use time from the mechanical apparatus 200, but may acquire the cumulative use time by user's input operation via an input unit (not shown) included in the later-described diagnostic apparatus 100, such as a keyboard or a touch panel. The context information acquired by the user's input operation is not limited to the cumulative use time, and may be information of the specifications of the tool to be used (e.g., the diameter of the tool, the number of blades of the tool, the material of the tool, and whether or not the tool is coated) or information of the processing target (e.g., a material), for example.

The sensing information acquisition unit 112 acquires, as the sensing information sensed by the sensing units 220 arranged in the target machine 200(1) and the other mechanical apparatuses 200(k), each of the physical quantities in the target machine 200(1) and the other mechanical apparatuses 200(k), the physical quantities changing according to operation of each of the target machine 200(1) and the other mechanical apparatuses 200(k).

Specifically, the sensing information acquisition unit 112 acquires, for example, the sensing information of the target machine 200(1), the physical quantity of vibration, sound, etc. from the target machine 200(1) itself and the physical quantities of vibration, sound, etc. from the other mechanical apparatuses 200(k) being superimposed on the sensing information and the physical quantities being sensed by the sensing unit 220 of the target machine 200(1). Moreover, the sensing information acquisition unit 112 acquires the sensing information of the other mechanical apparatuses 200(k), the physical quantities of vibration, sound, etc. from the other mechanical apparatuses 200(k) themselves and the physical quantity of vibration, sound, etc. from the target machine 200(1) being superimposed on the sensing information and the physical quantities being sensed by the sensing units 220 of the other mechanical apparatuses 200(k). The sensing information acquisition unit 112 outputs the acquired sensing information of the target machine 200(1) and the acquired sensing information of the other mechanical apparatuses 200(k) to the sensing information separation unit 113.

Figure 4A:
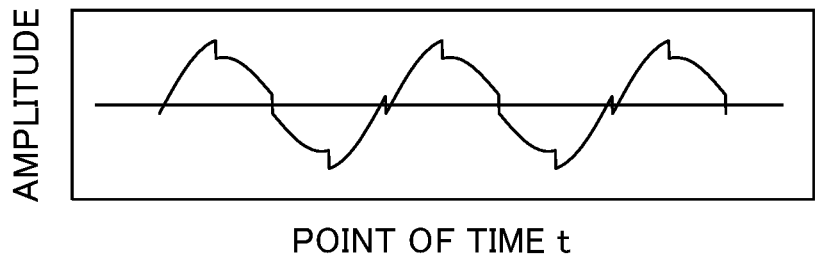
FIG. 4A is a graph showing one example of target machine sensing information on which vibration from a target machine itself and vibration from other mechanical apparatuses are superimposed.
Figure 4B:
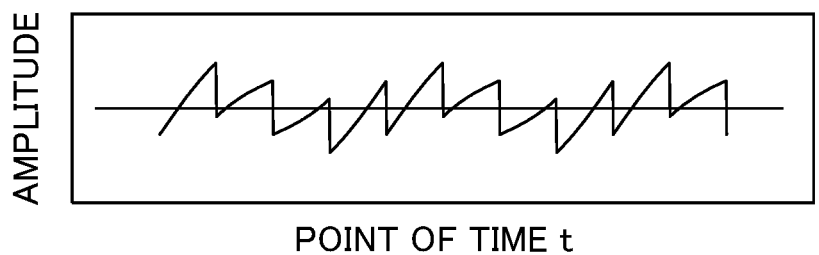
FIG. 4B is a graph showing one example of sensing information of the other mechanical apparatuses on which vibration from the other mechanical apparatuses themselves and vibration from the target machine are superimposed.
Figure 4C:
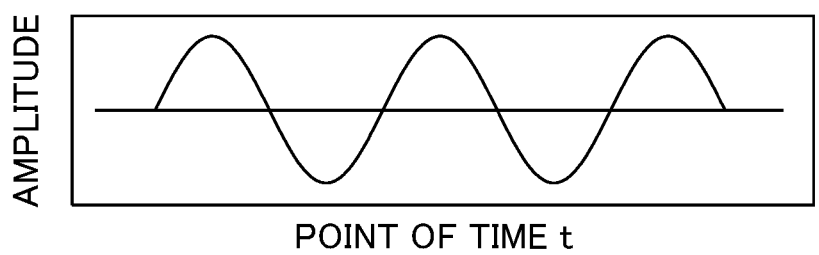
FIG. 4C is a graph showing one example of vibration from the target machine itself.
Figure 4D:
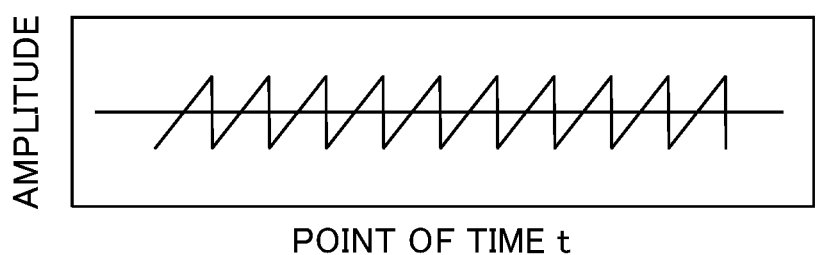
FIG. 4D is a graph showing one example of vibration from the other mechanical apparatuses themselves.

FIG. 4A is a graph showing one example of the sensing information of the target machine 200(1), vibration from the target machine 200(1) itself and vibration from the other mechanical apparatuses 200(k) being superimposed on the sensing information. FIG. 4B is a graph showing one example of the sensing information of the other mechanical apparatuses 200(k), vibration from the other mechanical apparatuses 200(k) themselves and vibration from the target machine 200(1) being superimposed on the sensing information. FIG. 4C is a graph showing one example of vibration from the target machine 200(1) itself. FIG. 4D is a graph showing one example of vibration from the other mechanical apparatuses 200(k) themselves.

Hereinafter, vibration waveforms indicated by the sensing information (the physical quantity information) of FIGS. 4A to 4D will be also each referred to as functions "$f_1(t)$," "$f_k(t)$," "$F_1(t)$," and "$F_k(t)$." A variable "t" indicates the point of time that the vibration waveform is sensed.

Note that FIGS. 4A to 4D show the waveforms in a case where the physical quantity is vibration, but the same also applies to the case of physical quantities other than vibration, such as sound.

The sensing information separation unit 113 separates the physical quantity information indicating the physical quantity of the target machine 200(1) and the physical quantity information indicating the physical quantities of the other mechanical apparatuses 200(k) from each other based on the context information of each of the plurality of mechanical apparatuses 200 acquired by the context information acquisition unit 111 and the sensing information of each of the target machine 200(1) and the other mechanical apparatuses 200(k) acquired by the sensing information acquisition unit 112.

Specifically, the sensing information (the physical quantity information) $f_1(t)$, $f_k(t)$, $F_1(t)$, $F_k(t)$ of the vibration waveforms shown in FIGS. 4A to 4D can be associated with each other as in Expression (1) and Expression (2).

$$f_1(t)=a_{11} \times F_1(t)+a_{1k} \times F_k(t)=F_1(t)+a_{1k} \times F_k(t) \tag{1}$$

$$f_k(t)=a_{k1} \times F_1(t)+a_{kk} \times F_k(t)=a_{k1} \times F_1(t)+F_k(t) \tag{2}$$

The coefficient $a_{11}$ as described herein is a weighting coefficient indicating the level of influence of operation of the target machine 200(1) on the physical quantity information of the target machine 200(1), and is "1." The coefficient $a_{1k}$ is a weighting coefficient indicating the level of influence of operation of the other mechanical apparatuses 200(k) on the physical quantity information of the target machine 200(1). The coefficient $a_{k1}$ indicates the level of influence of operation of the target machine 200(1) on the physical quantity information of the other mechanical apparatuses 200(k). The coefficient $a_{kk}$ indicates the level of influence of operation of the other mechanical apparatuses 200(k) on the physical quantity information of the other mechanical apparatuses 200(k), and is "1."

The sensing information separation unit 113 operates the target machine 200(1) in a state in which the other mechanical apparatuses 200(k) are completely stopped, and via the sensing information acquisition unit 112, acquires the sensing information (the physical quantity information) $F_1(t)$ sensed by the sensing unit 220 of the target machine 200(1). Moreover, the sensing information separation unit 113 operates the other mechanical apparatuses 200(k) in a state in which the target machine 200(1) is completely stopped, and via the sensing information acquisition unit 112, acquires the sensing information (the physical quantity information) $F_k(t)$ sensed by the sensing units 220 of the other mechanical apparatuses 200(k). Further, the sensing information separation unit 113 acquires, via the sensing information acquisition unit 112, the sensing information (the physical quantity information) $f_1(t)$, $f_k(t)$ when the target machine 200(1) and the other mechanical apparatuses 200(k) are in operation.

With this configuration, the sensing information separation unit 113 can determine the coefficient $a_{1k}$ and the coefficient $a_{k1}$ from Expression (1) and Expression (2). In other words, the sensing information separation unit 113 can separate, based on Expression (1), Expression (2), the determined coefficient $a_{1k}$, and the determined coefficient $a_{k1}$, the physical quantity information $F_1(t)$ of the target machine 200(1) and the physical quantity information $F_k(t)$ of the other mechanical apparatuses 200(k) from each other.

Note that Expression (1) and Expression (2) are expressions in the case of the target machine 200(1) and one of the other mechanical apparatuses 200(k), but the case of two or more of the other mechanical apparatuses 200(k) can be similarly expressed as in Expression (1) and Expression (2). Moreover, the sensing information separation unit 113 can separate the physical quantity information of the target machine 200(1) and the physical quantity information of two or more of the other mechanical apparatuses 200(k) from each other.

Alternatively, the sensing information separation unit 113 may separate, from the physical quantity information $F_1(t)$ of vibration from the target machine 200(1) itself, physical quantity information due to the processing and physical quantity information due to operation of a power-ON device (e.g., a cooling fan) included in the target machine 200(1) and not directly relating to the processing. For example, in a case where the physical quantity information due to the processing is $F_{1m}(t)$ and the physical quantity information due to operation of the device not directly relating to the processing is $F_{1s}(t)$ in the target machine 200(1), the vibration $F_1(t)$ from the target machine 200(1) itself is associated as in Expression (3).

$$F_1(t) = F_{1m}(t) + F_{1s}(t) \tag{3}$$

By assigning Expression (3) to Expression (1), Expression (1) is expressed as in Expression (4).

$$f_1(t) = F_{1m}(t) + F_{1s}(t) + a_{1k} \times F_k(t) \tag{4}$$

Thus, in a state in which the target machine 200(1) does not perform the processing and the other mechanical apparatuses 200(k) perform the processing, the sensing information (the physical quantity information) $f_1(t)$ sensed by the sensing unit 220 of the target machine 200(1) is $F_{1s}(t) + a_{1k} \times F_k(t)$ because of $F_{1m}(t)=0$. In a state in which the target machine 200(1) and the other mechanical apparatuses 200(k) do not perform the processing, the sensing information (the physical quantity information) $f_1(t)$ sensed by the sensing unit 220 of the target machine 200(1) is $F_{1s}(t)$ because of $F_{1m}(t)=0$ and $F_k(t)=0$. Both or either one of $F_1(t)+a_{1k} \times F_k(t)$ and $F_{1s}(t)$ as the sensing information $f_1(t)$ are stored in the later-described storage unit 115.

Then, the sensing information separation unit 113 calculates, from the sensing information $f_1(t)$ sensed by the sensing unit 220 of the target machine 200(1) in a state in which the target machine 200(1) and the other mechanical apparatuses 200(k) perform the processing, a difference from the stored sensing information $F_{1s}(t) + a_{1k} \times F_k(t)$ and/or $F_{1s}(t)$. With this configuration, the sensing information separation unit 113 can separate the physical quantity information $F_{1m}(t)$, $F_{1s}(t)$, $a_{1k} \times F_k(t)$.

For example, in a case where the physical quantity information $F_{1s}(t)$ due to operation of the device not directly relating to the processing is greater than the physical quantity information $F_{1m}(t)$ due to the processing, the later-described anomaly determination unit 117 can more accurately determine, as compared to the case of the physical quantity information $F_1(t)$, whether or not operation of the target machine 200(1) is normal based on the physical quantity information $F_{1m}(t)$.

Note that the physical quantity information due to operation of the device included in the target machine 200(1) and not directly relating to the processing in the target machine 200(1) includes, for example, vibration or the temperature of the cooling apparatus (e.g., the cooling fan or a chiller of the control apparatus 210 or an electric motor), vibration or the temperature of a pump that supplies the lubricant (oil or grease), the temperature of the control apparatus (specifically the numerical value control apparatus) 210, and vibration sound (coil whine) of a transformer or a solenoid coil during power distribution.

The feature information extraction unit 114 extracts the feature information indicating the feature of the physical quantity information $F_1(t)$ in an interval including a specific operation interval indicated by the context information of the target machine 200(1) from the physical quantity information $F_1(t)$ of the target machine 200(1) separated by the sensing information separation unit 113.

Figure 5:
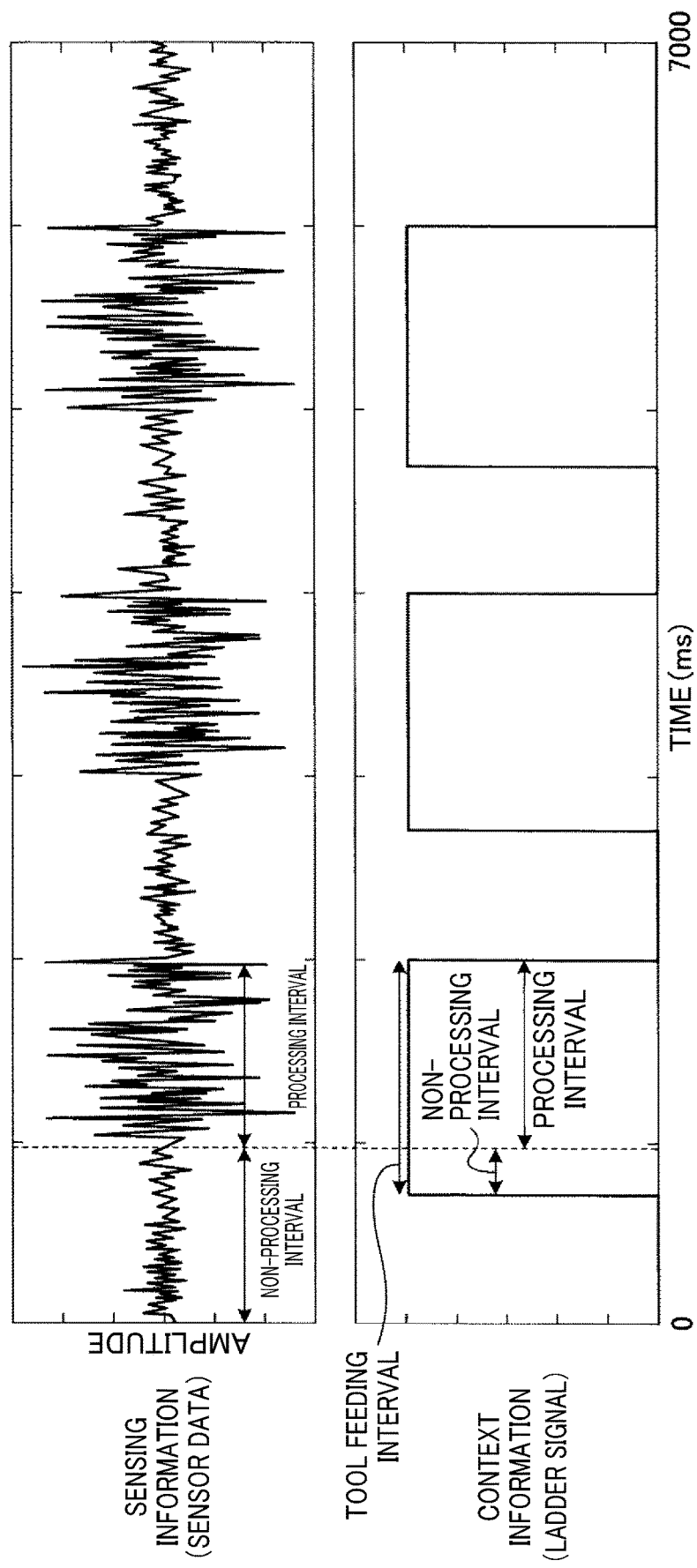
FIG. 5 is a graph showing one example of the sensing information acquired by a sensing information acquisition unit and a ladder signal in context information acquired by a context information acquisition unit.

FIG. 5 is a graph showing one example of the sensing information (the physical quantity information, sensor data) acquired by the sensing information acquisition unit 112 and the above-described ladder signal of the context information acquired by the context information acquisition unit 111. As shown in FIG. 5, the sensing information includes waveform portions indicating non-processing intervals before and after contact of the tool with the processing target and waveform portions indicating processing intervals that the tool contacts the processing target to perform the actual processing. As described above, the target machine 200(1) outputs, as part of the context information, the ladder signal as the ON/OFF signal indicating the interval until the end of the actual processing after the operation of feeding the tool to the processing target, for example. Specifically, the target machine 200(1) turns on the ladder signal at the start of the processing by the tool to perform the operation of feeding the tool to the processing target, and turns off the ladder signal after the end of the actual processing, for example. In this case, the target machine 200(1) does not always turn on the ladder signal after the tool has contacted the processing target. Thus, as shown in FIG. 5, the interval (hereinafter also referred to as a "tool feeding interval") that the ladder signal is an ON state includes the non-processing interval as an interval (e.g., an interval that the operation of feeding the tool to the processing target is performed) that the tool does not contact the processing target and the processing interval that the tool contacts the processing target to perform the processing. Further, an interval that is not the tool feeding interval (the operation interval), i.e., an interval that the ladder signal is in an OFF state, is the non-processing interval. In this case, depending on the processing conditions etc., it is difficult to correctly determine the processing interval based on the tool feeding interval due to, e.g., an unclear distance between the processing target and the tool. In the case of using the sensing information included in the tool feeding interval in the processing (diagnostic processing) of determining an anomaly in operation of the target machine 200(1), the sensing information in the non-processing interval is included, and for this reason, problems such as determination accuracy degradation are caused. Thus, as described later, it is important for high-accuracy diagnostic processing to accurately estimate the processing intervals from the sensing information and use the sensing information (and therefore the later-described feature information extracted therefrom) included in the estimated processing intervals for the diagnostic processing.

Specifically, the feature extraction unit 1141 of the feature information extraction unit 114 extracts the feature information to be used for, e.g., determination by the later-described anomaly determination unit 117 from the physical quantity information (the sensing information) $F_1(t)$ of the target machine 200(1) separated by the sensing information separation unit 113. The feature information may be any information as long as the feature information is information indicating the feature of the physical quantity information (the sensing information). For example, in a case where the physical quantity information is sound data, the feature extraction unit 1141 may extract, as the feature information, an energy, a frequency spectrum, a mel frequency cepstral coefficient (MFCC), etc.

Figure 6:
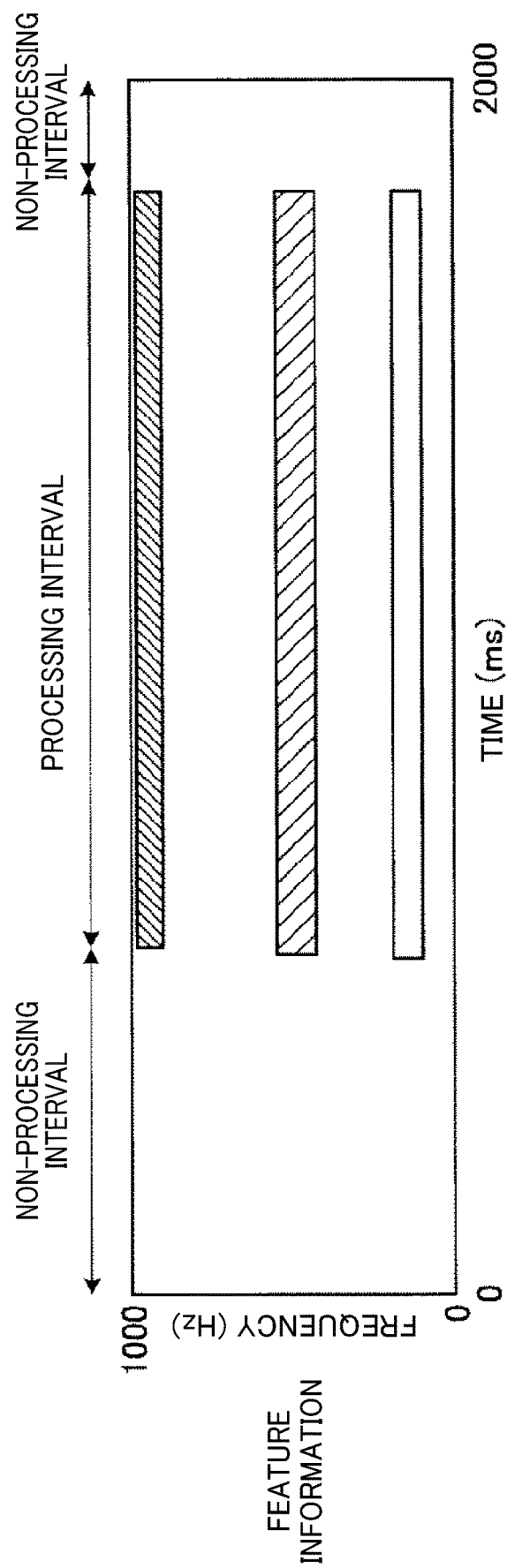
FIG. 6 is a graph showing one example of feature information extracted by a feature extraction unit from physical quantity information of the target machine.

FIG. 6 is a graph showing one example of the feature information extracted by the feature extraction unit 1141 from the physical quantity information $F_1(t)$ of the target machine 200(1). In the present embodiment, the frequency spectrum will be described as the feature information to be extracted. The feature information extraction unit 114 performs Fourier transform for each window of the physical quantity information $F_1(t)$ to extract the feature information. The window described herein indicates a data amount of the physical quantity information $F_1(t)$ for predetermined time (e.g., 20 ms), and for example, corresponds to a data amount of a window length in a case where the feature information is the frequency spectrum obtained by Fourier transform for the physical quantity information $F_1(t)$. The feature information shown in FIG. 6 is associated with the corresponding time of the window of the physical quantity information. As shown in FIG. 6, the frequency spectrum in the processing interval has a feature different from that of the frequency spectrum of the non-processing interval. Note that FIG. 6 schematically shows a difference between the feature information in the non-processing interval and the feature information in the processing interval. Thus, although no frequency components are shown in the non-processing interval, it does not mean that each frequency component is not present in the non-processing interval.

In description below, for estimating one processing interval, the feature extraction unit 1141 utilizes, from the physical quantity information $F_1(t)$ of the target machine 200(1), the feature information extracted from a predetermined area (e.g., the interval including the interval that the ladder signal is in the ON state) of the physical quantity information.

The selection unit 1142 selects, for example, the feature information of each window from the feature information extracted by the feature extraction unit 1141.

Figure 7:
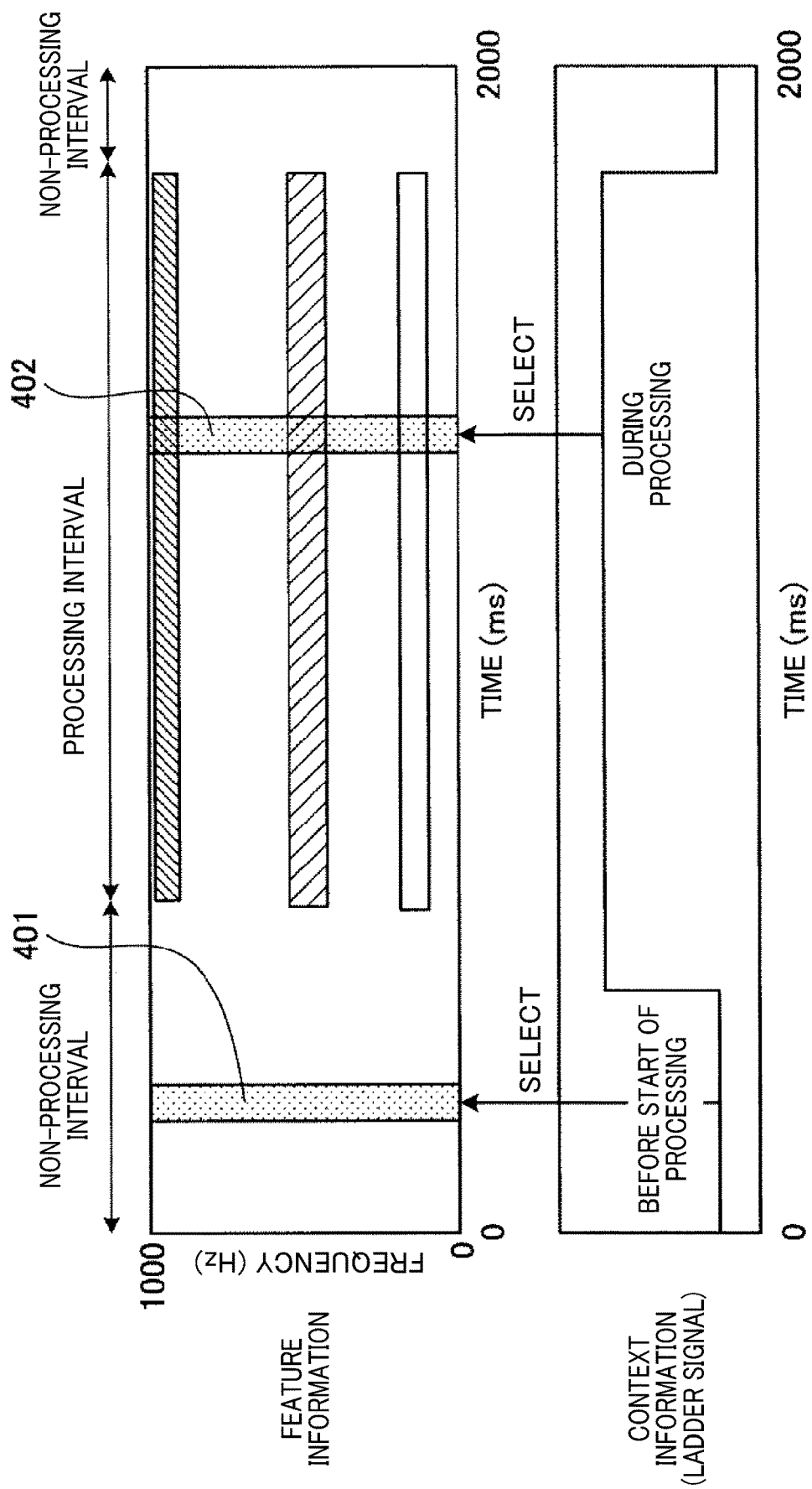
FIG. 7 is a graph showing an example where a selection unit has selected the feature information corresponding to a window of a selected portion in the feature information in a non-processing interval and the feature information corresponding to a window of a selected portion in the feature information in a processing interval.

FIG. 7 is a graph showing an example where the selection unit 1142 has selected the feature information corresponding to a window of a selected portion 401 in the feature information in the non-processing interval and the feature information corresponding to a window of a selected portion 402 in the feature information in the processing interval. For example, in the case of selecting the feature information in the non-processing interval, the selection unit 1142 may select, as in the selected portion 401 shown in FIG. 7, the feature information in the interval (intervals other than the tool feeding interval) that the ladder signal is in the OFF state. On the other hand, in the case of selecting, e.g., the feature information in the processing interval, the selection unit 1142 may select, as in the selected portion 402 shown in FIG. 7, the feature information in the second half of the interval that the ladder signal is in the ON state because the first half might include the non-processing interval.

In description below, the selection unit 1142 selects the feature information in the non-processing interval as reference feature information for comparison with the feature information selected in other portions (windows) with reference to the feature information in the non-processing interval. Moreover, the selection unit 1142 sequentially selects the feature information in units of window for comparison with the reference feature information in the above-described predetermined area (e.g., the interval including the interval that the ladder signal is in ON state). Note that the selection unit 1142 may select, as the reference feature information, information generated by, e.g., machine learning for the feature information included in the non-processing interval.

In the case of selecting the reference feature information in the non-processing interval, the selection unit 1142 does not necessarily select the feature information in the interval (the intervals other than the tool feeding interval) that the ladder signal is in the OFF state. For example, there is a high probability that an interval right after the ladder signal has been turned on is also the non-processing interval, and for this reason, the selection unit 1142 may select the feature information in such an immediate interval as the reference feature information. Using the number of rotations of the not-shown drive unit obtained from the context information transmitted by the target machine 200(1), the diagnostic apparatus 100 may determine a period that the number of rotations is that for performing the actual processing, and such a determination result may be used instead of the ladder signal. The selection unit 1142 may sort and select, as the technique of selecting the feature information in the non-processing interval, the feature information by means of, e.g., a statistical technique or the machine learning.

In a case where the selection unit 1142 sequentially selects, for comparison with the reference feature information, the feature information in units of window in the above-described predetermined area, the windows may overlap with each other.

For calculation of later-described processing interval likelihood, the selection unit 1142 may use, as the selected reference feature information, information obtained by averaging of a predetermined number of pieces of previously-selected reference feature information, for example. With this configuration, influence of, e.g., noise that might be included in the selected reference feature information can be reduced.

Figure 8:
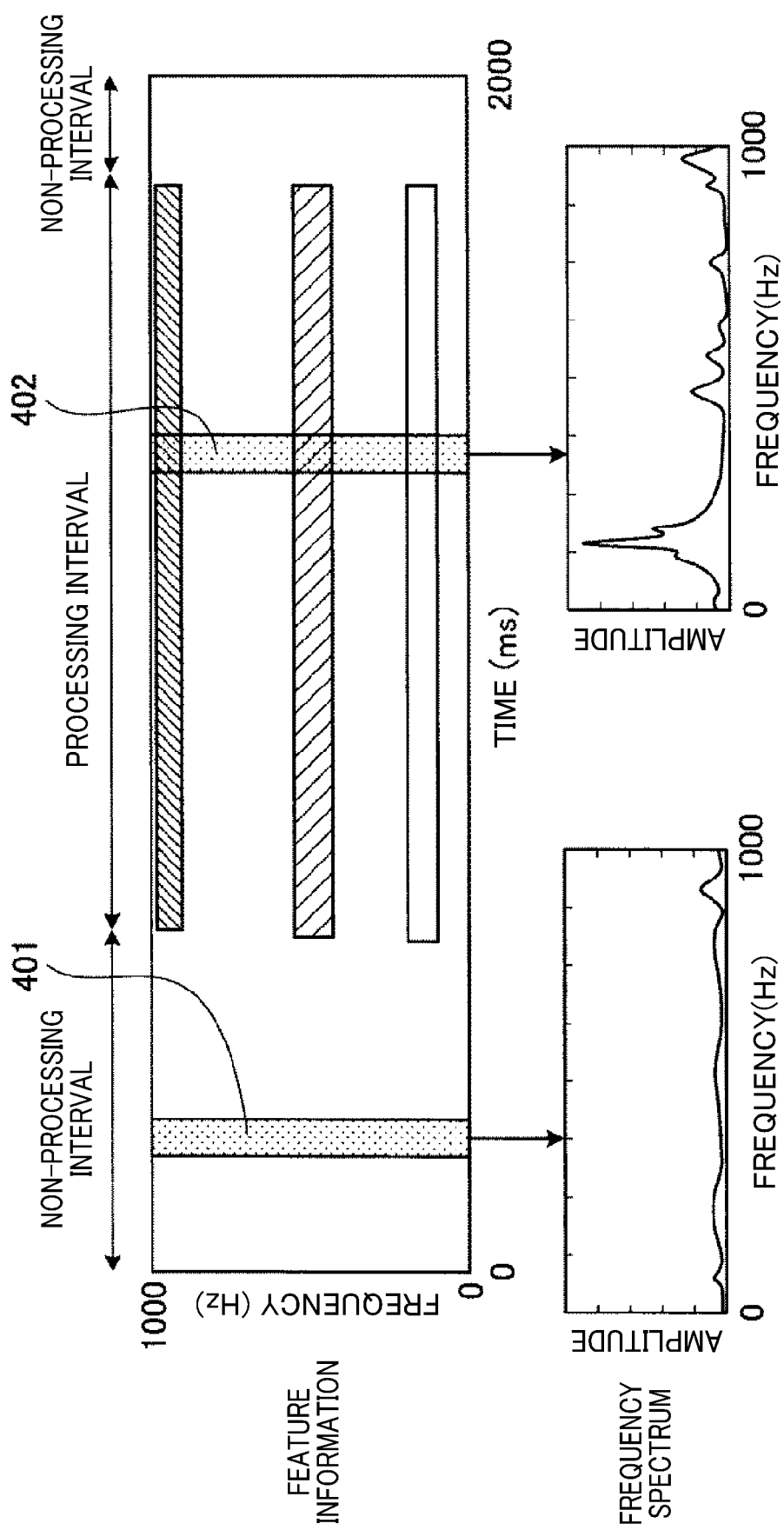
FIG. 8 is a graph showing one example of a frequency spectrum as the feature information corresponding to the window of the selected portion selected by the selection unit and a frequency spectrum as the feature information corresponding to the window of the selected portion.

FIG. 8 is a graph showing one example of the frequency spectrum as the feature information corresponding to the window of the selected portion 401 selected by the selection unit 1142 and the frequency spectrum as the feature information corresponding to the window of the selected portion 402. In FIG. 8, the frequency spectrum in the selected portion 402 is a frequency spectrum in the processing interval that the tool contacts the processing target to perform the processing, and therefore, is a frequency spectrum whose amplitude is great in a specific frequency component. On the other hand, the frequency spectrum in the selected portion 401 shows a small vibration amplitude indicated by the sensing information $F_1(t)$ in the non-processing interval that the tool does not contact the processing target, and the amplitude shown by the frequency spectrum as the feature information $F_1(t)$ is also small. Note that as described above, the frequency spectra in the selected portions 401, 402 of FIG. 8 are one example. For example, the selected portion 401 in the non-processing interval may have a smaller amplitude shown by the frequency spectrum than that of the selected portion 402 in the processing interval.

The calculation unit 1143 compares the selected reference feature information (the feature information in the non-processing interval) and the sequentially-selected feature information (hereinafter also referred to as "target feature information") in the above-described predetermined area (e.g., the interval including the interval that the ladder signal is in ON state) with each other, thereby calculating the processing interval (operation interval) likelihood of the target feature information. Note that, e.g., a comparison method using a Euclidean distance, a cross-correlation coefficient, or a Gaussian mixture model (GMM) may be used as the method for comparing the reference feature information and the target feature information.

Figure 9:
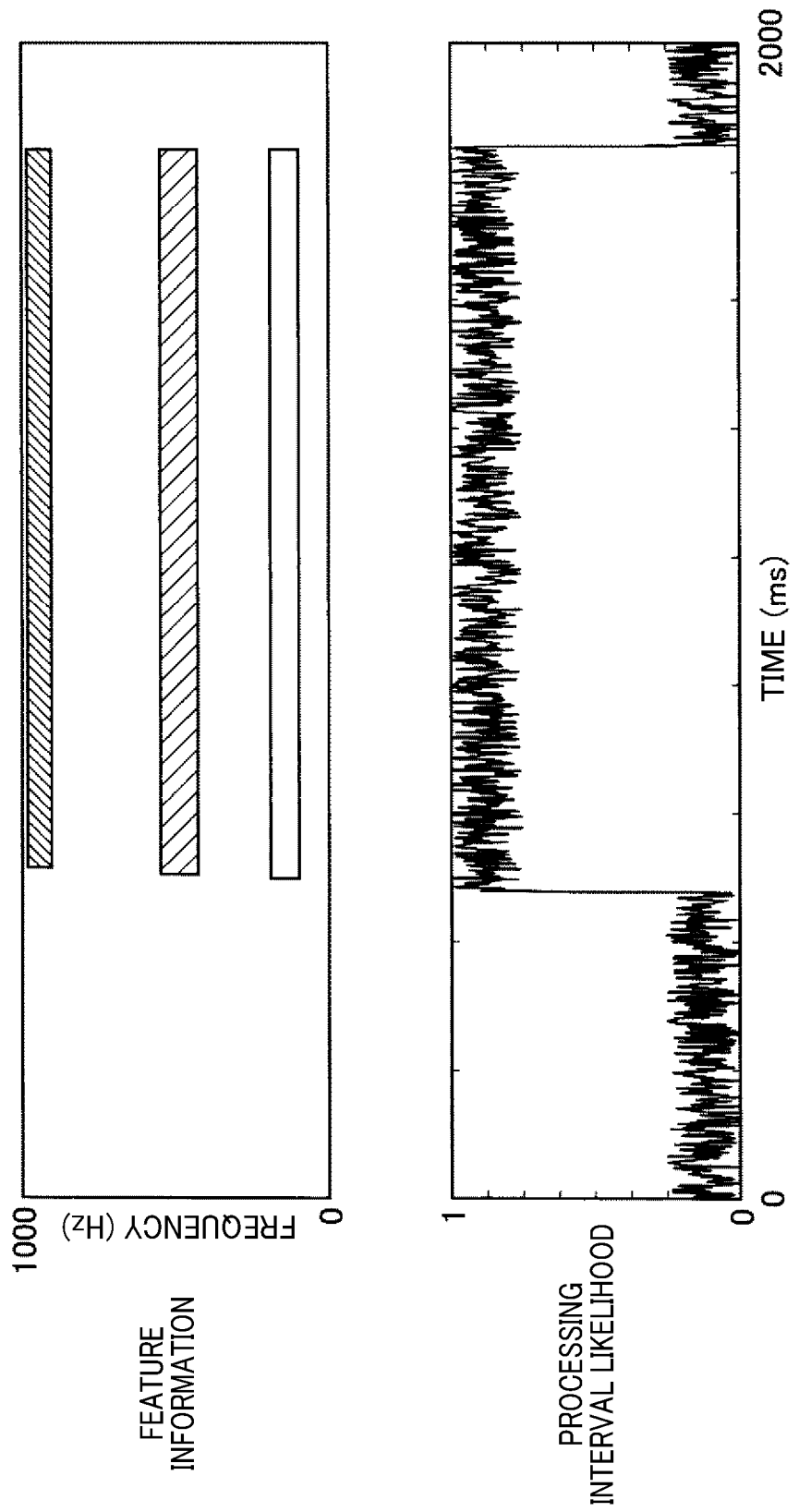
FIG. 9 is a graph showing one example where a Euclidean distance between reference feature information and target feature information is obtained and a normalized value thereof is calculated as processing interval likelihood.

FIG. 9 is a graph showing one example where the calculation unit 1143 obtains a Euclidean distance between the reference feature information and the target feature information, and calculates a normalized value thereof as the processing interval likelihood. FIG. 9 indicates that the closer the processing interval likelihood is to "1," the higher the processing interval likelihood is. Note that the processing interval likelihood is calculated from the feature information extracted from the physical quantity information $F_1(t)$ including noise, and for this reason, is a variable value as shown in FIG. 9.

Note that the selection unit 1142 selects the feature information in the non-processing interval as the reference feature information and the calculation unit 1143 calculates the processing interval likelihood of the target feature information by comparison with the reference feature information, but the present disclosure is not limited to such a configuration. For example, the selection unit 1142 may select the feature information in the processing interval as the reference feature information, and the calculation unit 1143 may calculate the processing interval likelihood. Moreover, in this case, the feature information extraction unit 114 may extract non-processing interval likelihood instead of the processing interval likelihood. Note that a value indicating the non-processing interval likelihood is a value indicating the inverse of the processing interval likelihood.

The interval determination unit 1144 performs threshold determination for the processing interval likelihood calculated by the calculation unit 1143.

The estimation unit 1145 estimates, as the processing interval, an interval that the interval determination unit 1144 determines the processing interval likelihood as greater than a predetermined threshold.

Then, the feature information extraction unit 114 outputs the feature information in the estimated processing interval to the anomaly determination unit 117.

Figure 10:
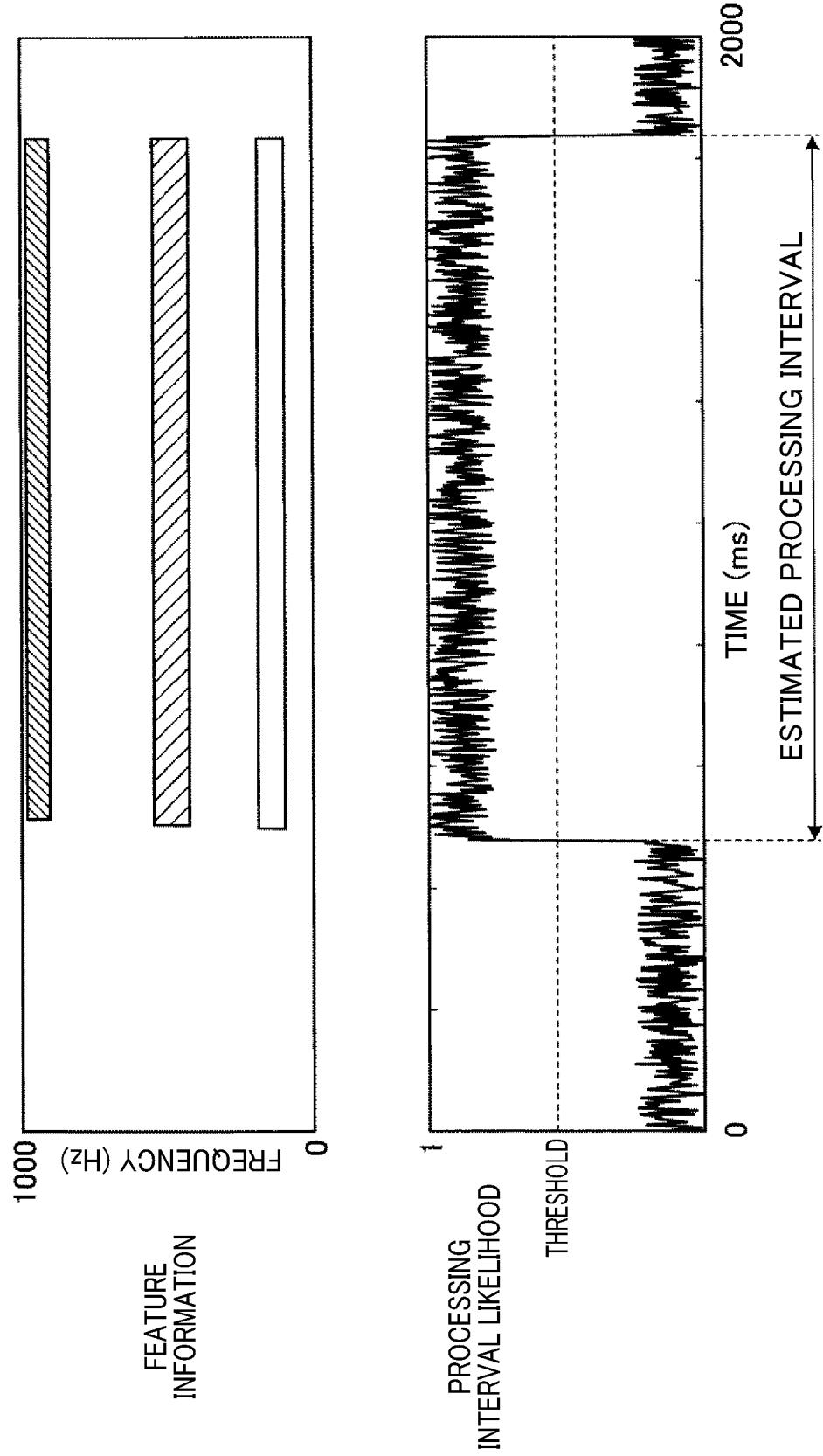
FIG. 10 is a graph showing one example where an interval determination unit performs threshold determination for the processing interval likelihood calculated by a calculation unit and an estimation unit estimates the processing interval.

FIG. 10 is a graph showing one example where the interval determination unit 1144 performs threshold determination for the processing interval likelihood calculated by the calculation unit 1143 and the estimation unit 1145 estimates the processing interval. As shown in FIG. 10, the "ESTIMATED PROCESSING INTERVAL" that the processing interval likelihood is greater than the predetermined threshold is estimated as the processing interval. Conversely, an interval that the processing interval likelihood is less than the threshold can be estimated as the non-processing interval. As described above, the physical quantity information (the feature information) included in the estimated processing interval is used for the diagnostic processing so that high-accuracy diagnostic processing can be performed.

Note that the interval determination unit 1144 performs threshold determination for the processing interval likelihood to estimate the processing interval, but the present disclosure is not limited to such a configuration. For example, determination may be performed for the processing interval likelihood by means of a statistical technique.

The storage unit 115 is, for example, a read only memory (ROM) or a hard disk drive (HDD), and stores the system program and the application program. Moreover, the storage unit 115 stores a model generated by the later-described generation unit 116 in association with the context information.

Alternatively, the storage unit 115 may store data on both or either one of the sensing information $F_{1s}(t)+a_{1k} \times F_k(t)$ and $F_{1s}(t)$ of the target machine 200(1).

Alternatively, for each mechanical apparatus 200, the storage unit 115 may store, as operation history information, the sensing information acquired by the sensing information acquisition unit 112 in association with the context information acquired by the context information acquisition unit 111.

By learning using the feature information extracted by the feature extraction unit 1141 from the sensing information in normal operation of the target machine 200(1), the generation unit 116 generates the model for determining whether or not the processing has been normally performed, the model corresponding to the context information acquired by the context information acquisition unit 111. Note that in a case where the model is generated by an external apparatus, the generation unit 116 is not necessarily provided. Alternatively, in a case where the context information for which no model has been set and the sensing information corresponding to such context information are input, the generation unit 116 may generate the model corresponding to the context information by means of the feature information extracted from such sensing information.

The anomaly determination unit 117 is a functional unit that determines, using the feature information extracted by the feature information extraction unit 114 and the model corresponding to the context information acquired by the context information acquisition unit 111, whether or not operation of the target machine 200(1) is normal. The anomaly determination unit 117 calculates, using the corresponding model, likelihood indicating that the feature information extracted from the sensing information is normal. The anomaly determination unit 117 compares the likelihood and a preset threshold, and in a case where the likelihood is, e.g., equal to or greater than the threshold, it is determined that operation of the target machine 200(1) is normal. In a case where the likelihood is less than the threshold, the anomaly determination unit 117 determines that operation of the target machine 200(1) is anomalous.

Note that in a case where the anomaly determination unit 117 has determined that the target machine 200(1) is anomalous, the anomaly determination unit 117 may determine such an anomaly in more detail based on the operator information included in the context information. For example, in a case where an operator responsible for attachment of the tool to the target machine 200(1) is an expert/person causing few operation errors, the anomaly determination unit 117 may determine that the probability of deterioration of the target machine 200(1) or the tool is high. In a case where the operator is a young person or a person causing a lot of operation errors, the anomaly determination unit 117 may determine that there is the probability of failure in an attachment state of the tool in addition to deterioration of the target machine 200(1) or the tool.

For example, in a case where the target machine 200(1) is performing high-accuracy processing such as finishing, if the percentage of the physical quantity information $a_{1k} \times F_k(t)$ of the other mechanical apparatuses 200(k) in the sensing information $f_1(t)$ such as vibration of the target machine 200(1) is equal to or greater than an acceptable predetermined value, the operation restriction command output unit 118 stops the other mechanical apparatuses 200(k).

With this configuration, the accuracy of the processing such as finishing in the target machine 200(1) can be maintained. That is, operation accuracy in the target machine 200(1) can be maintained.

The notification control unit 119 controls notification operation of the notification unit 130.

The notification unit 130 is, for example, a display apparatus such as a liquid crystal display, an indication lamp, a buzzer, or a communication apparatus, and notifies various types of information according to control by the notification control unit 119.

<Processing Interval Estimation Processing of Diagnostic Apparatus 100>

Next, operation according to processing interval estimation processing of the diagnostic apparatus 100 according to the present embodiment will be described.

Figure 11:
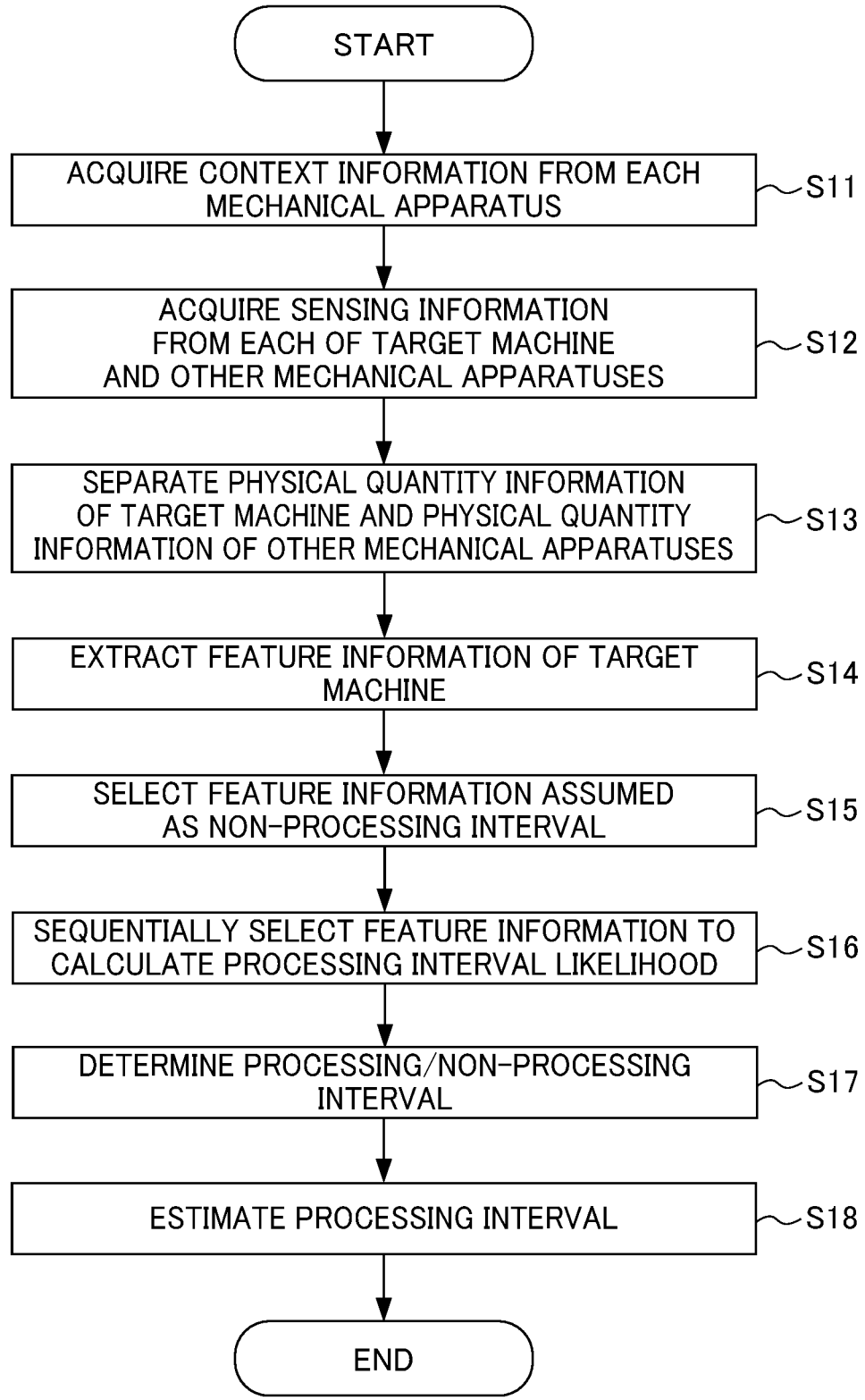
FIG. 11 is a flowchart for describing processing interval estimation processing of the diagnostic apparatus.

FIG. 11 is a flowchart for describing the processing interval estimation processing of the diagnostic apparatus 100. A flow described herein is repeatedly executed every time the target machine 200(1) is specified by the user of the diagnostic apparatus 100.

At Step S11, the context information acquisition unit 111 acquires, from each mechanical apparatus 200, the context information corresponding to the operation being performed among the plurality of pieces of context information set based on the type of operation of each mechanical apparatus 200.

At Step S12, the sensing information acquisition unit 112 acquires the physical quantity sensing information sensed by each of the sensing units 220 of the target machine 200(1) and the other mechanical apparatuses 200(k).

At Step S13, the sensing information separation unit 113 separates the physical quantity information $F_1(t)$ of the target machine 200(1) and the physical quantity information $F_k(t)$ of the other mechanical apparatuses 200(k) from each other based on the context information of each mechanical apparatus 200 acquired at Step S11 and the sensing information of each of the target machine 200(1) and the other mechanical apparatuses 200(k) acquired at Step S12.

At Step S14, the feature extraction unit 1141 of the feature information extraction unit 114 extracts the feature information from the physical quantity information $F_1(t)$ of the target machine 200(1) separated at Step S13. The feature extraction unit 1141 extracts, for example, the feature information by performing Fourier transform for each window of the physical quantity information $F_1(t)$ in the predetermined area (e.g., the interval including the interval that the ladder signal is in the ON state).

At Step S15, the selection unit 1142 of the feature information extraction unit 114 selects the feature information for each window from the feature information extracted at Step S14. Specifically, the selection unit 1142 selects, as the reference feature information, the above-described feature information in the non-processing interval.

At Step S16, the selection unit 1142 sequentially selects the feature information (the target feature information) in units of window for comparison with the reference feature information in the predetermined area (e.g., the interval including the interval that the ladder signal is in the ON state). Then, the calculation unit 1143 of the feature information extraction unit 114 compares the reference feature information (the feature information in the non-processing interval) selected at Step S15 and the sequentially-selected target feature information in the predetermined area, thereby calculating the processing interval likelihood of the target feature information.

At Step S17, the interval determination unit 1144 of the feature information extraction unit 114 performs threshold determination for the processing interval likelihood calculated at Step S16, and determines that the interval whose processing interval likelihood has been determined as greater than the predetermined threshold is the processing interval or determines that the interval whose processing interval likelihood has been determined as less than the predetermined threshold is the non-processing interval.

At Step S18, the estimation unit 1145 of the feature information extraction unit 114 estimates, as the processing interval, the interval whose processing interval likelihood has been determined as greater than the predetermined threshold at Step S17.

<Diagnostic Processing of Diagnostic Apparatus 100>

Next, operation according to the diagnostic processing of the diagnostic apparatus 100 according to the present embodiment will be described.

Figure 12:
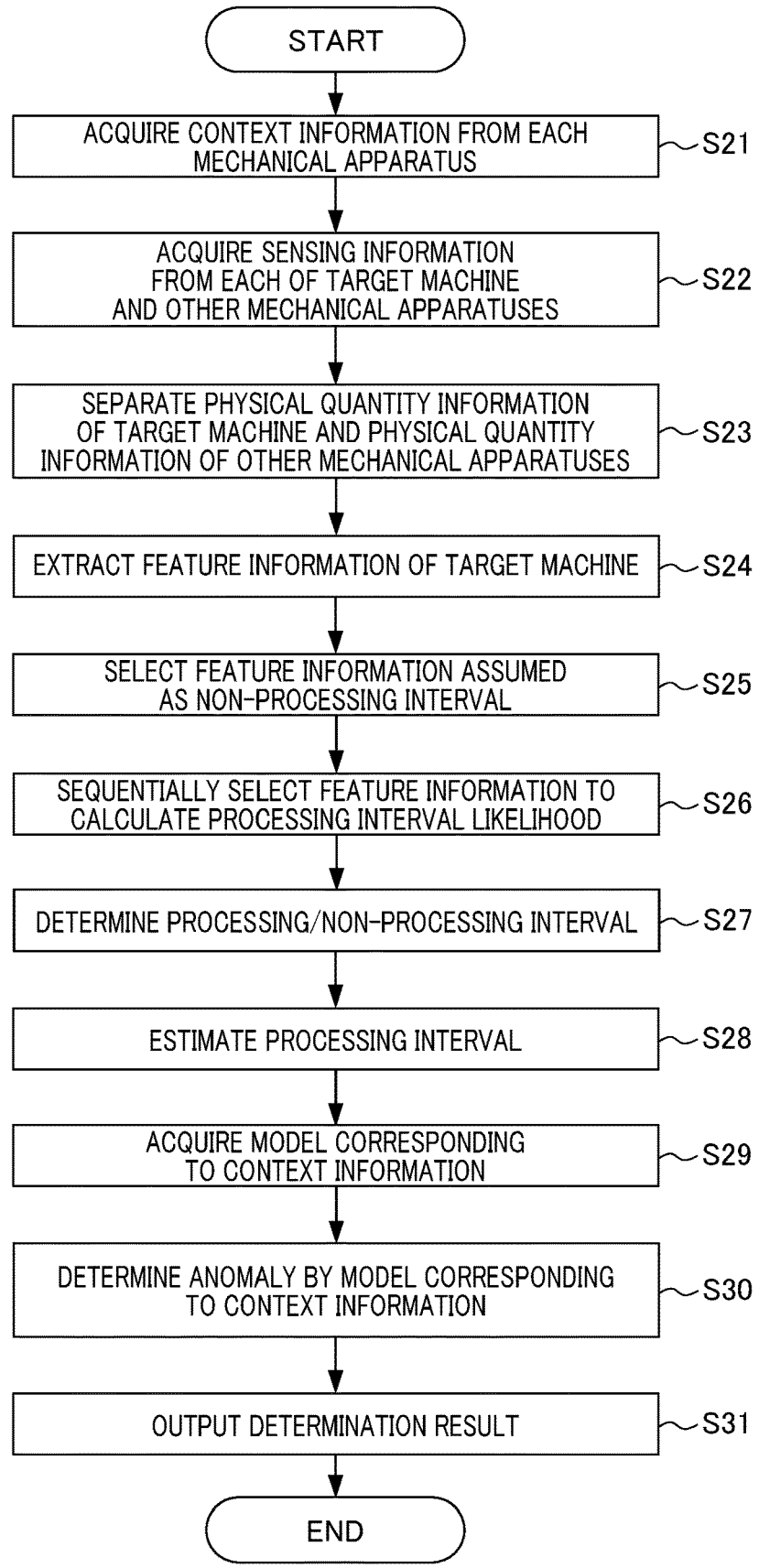
FIG. 12 is a flowchart for describing diagnostic processing of the diagnostic apparatus.

FIG. 12 is a flowchart for describing the diagnostic processing of the diagnostic apparatus 100. A flow described herein is repeatedly executed every time the target machine 200(1) is specified by the user of the diagnostic apparatus 100.

Note that in the diagnostic processing shown in FIG. 12, the processing of Steps S21 to S28 is similar to that of Steps S11 to S18 of FIG. 11, and description thereof will be omitted.

At Step S29, the anomaly determination unit 117 acquires, from the storage unit 115, the model corresponding to the context information acquired at Step S21.

At Step S30, the anomaly determination unit 117 determines, using the processing interval feature information estimated at Step S28 and the model corresponding to the context information acquired at Step S29, whether or not the target machine 200(1) is normally operated.

At Step S31, the notification control unit 119 outputs a determination result of Step S30 to the notification unit 130. Note that any method may be employed as the method for outputting the determination result of the anomaly determination unit 117. For example, the notification unit 130 may output the determination result to an external apparatus such as a server apparatus or a personal computer (PC).

<Model Generation Processing of Diagnostic Apparatus 100>

Next, operation according to model generation processing of the diagnostic apparatus 100 according to the present embodiment will be described.

Figure 13:
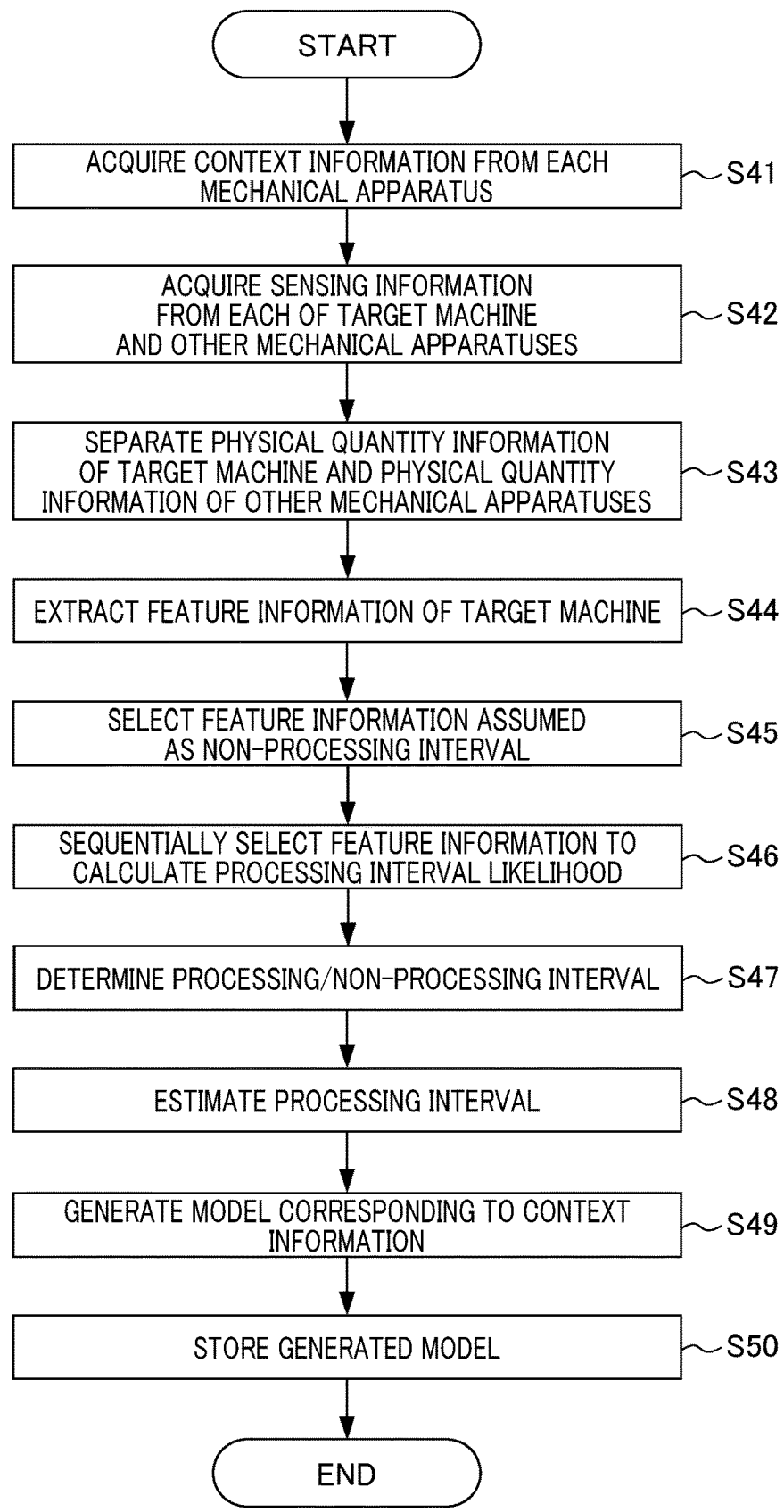
FIG. 13 is a flowchart for describing model generation processing of the diagnostic apparatus.

FIG. 13 is a flowchart for describing the model generation processing of the diagnostic apparatus 100. A flow described herein is, for example, executed in advance before the diagnostic processing. Alternatively, it may be configured such that the model generation processing is executed in a case where the context information for which no model has been set is input.

Note that in the diagnostic processing shown in FIG. 13, the processing of Steps S41 to S48 is similar to that of Steps S11 to S18 of FIG. 11, and description thereof will be omitted.

The context information and the physical quantity information, which are separated from each other, of the target machine 200(1) are utilized for model generation. The model is generated for each piece of context information, and for this reason, the physical quantity information needs to be associated with the corresponding context information. Thus, the sensing information acquisition unit 112 stores, in the storage unit 115 etc., the acquired sensing information in association with the context information acquired by the context information acquisition unit 111 at the same timing, for example. Each type of information may be temporarily stored in the storage unit 115 etc., it may be checked whether or not such information is information in a normal state, and the model may be generated using only the information in the normal state. That is, the model may be generated using the sensing information labelled as normal.

Check (labelling) on whether or not the information is normal may be executed at optional timing after the information has been stored in the storage unit 115 etc., or may be executed in real time while the target machine 200(1) and the other mechanical apparatuses 200(k) are being operated. The model may be generated without execution of labelling, assuming that the information is normal. In a case where the information assumed as normal is actually anomalous information, the determination processing is not correctly executed using the generated model. Such a situation can be determined based on, e.g., the frequency of determination as anomalous, and action such as deletion of the erroneously-generated model can be taken. Alternatively, the model generated from the anomalous information may be utilized as a model for determining the anomaly.

At Step S49, the generation unit 116 generates, from the processing interval feature information extracted at Step S48, the model corresponding to the context information acquired by the context information acquisition unit 111.

At Step S50, the generation unit 116 associates, for example, the generated model with the context information and the feature information, and stores such a model in the storage unit 115.

With the above-described configuration, the diagnostic apparatus 100 according to one embodiment acquires the context information of the operation being performed in each of the mechanical apparatuses 200(1) to 200(n) and the sensing information that is the physical quantity in each of the target machine 200(1) and the other mechanical apparatuses 200(k) and that is sensed by each of the sensing units 220 of the target machine 200(1) and the other mechanical apparatuses 200(k). The diagnostic apparatus 100 separates the physical quantity information of the target machine 200(1) and the physical quantity information of the other mechanical apparatuses 200(k) based on the acquired context information and the acquired sensing information. With this configuration, the diagnostic apparatus 100 can exclude influence of the other mechanical apparatuses 200(k) from the physical quantity information of the target machine 200(1), thereby avoiding degradation of physical quantity sensing accuracy and performing high-accuracy anomalous sensing in the target machine 200(1).

One embodiment has been described above, but the diagnostic apparatus 100 is not limited to that of the above-described embodiment. Variations, modifications, etc. made within a scope that an objective can be achieved are included.

<First Variation>

In the above-described embodiment, the diagnostic apparatus 100 has been described as an example of an apparatus different from the mechanical apparatuses 200(1) to 200(n), but any one of the control apparatuses 210 of the mechanical apparatuses 200(1) to 200(n) may include the functions of the diagnostic apparatus 100.

Alternatively, a server may include some or all of the context information acquisition unit 111, the sensing information acquisition unit 112, the sensing information separation unit 113, the feature information extraction unit 114, the storage unit 115, the generation unit 116, the anomaly determination unit 117, the operation restriction command output unit 118, and the notification control unit 119 of the diagnostic apparatus 100, for example. Each function of the diagnostic apparatus 100 may be implemented utilizing, e.g., a virtual server function on a cloud.

The diagnostic apparatus 100 may be a distributed processing system that each function of the diagnostic apparatus 100 is distributed to a plurality of servers as necessary.

<Second Variation>

For example, in the above-described embodiment, the diagnostic apparatus 100 acquires the context information from each of the control apparatuses 210 of the mechanical apparatuses 200(1) to 200(n) and acquires the sensing information from the sensing units 220, but the present disclosure is not limited to such a configuration. For example, in each of the mechanical apparatuses 200(1) to 200(n), the control apparatus 210 may acquire the sensing information from the sensing unit 220, and the acquired sensing information and the context information may be collectively transmitted to the diagnostic apparatus 100.

Alternatively, each of the mechanical apparatuses 200(1) to 200(n) may include an information aggregation unit (not shown) that aggregates the context information in the control apparatus 210 and the sensing information from the sensing unit 220 to transmit such information to the diagnostic apparatus 100.

<Third Variation>

For example, in the above-described embodiment, the non-contact sensing unit 220 is arranged in the mechanical apparatus 200 such as the robot or the automatic delivery apparatus, but the present disclosure is not limited to such a configuration. For example, in the case of acquiring information that does not need to be continuously acquired as the sensing information or information (e.g., temperature or vibration) with no influence of position shift or vibration of the mobile section, the mobile section in which the non-contact sensing unit 220 is arranged may be a wireless mobile section such as a drone.

<Fourth Variation>

For example, in the above-described embodiment, all of the mechanical apparatuses 200 have the sensing units 220, but the present disclosure is not limited to such a configuration. Some of the mechanical apparatuses 200 do not necessarily have the sensing units 220. For example, the non-contact sensing unit 220 may be arranged in the mechanical apparatus 200 such as the robot or the automatic delivery apparatus, thereby sensing the physical quantity of the mechanical apparatus 200 without the sensing unit 220. With this configuration, the diagnostic system 1 can reduce the number of necessary sensing units 220.

<Fifth Variation>

For example, in the above-described embodiment, the diagnostic apparatus 100 determines, using the feature information extracted by the feature information extraction unit 114 and the model corresponding to the context information acquired by the context information acquisition unit 111, whether or not the target machine 200(1) is normally operated, but the present disclosure is not limited to such a configuration. For example, based on the operation history information of the target machine 200(1) and a physical quantity (hereinafter also referred to as an "estimated physical quantity"), such as a load factor, that relates to the life of the component (e.g., a bearing or a ball screw) of the target machine 200(1) and that is estimated by, e.g., previous experiment or simulation, the diagnostic apparatus 100 may determine whether or not the target machine 200(1) is normally operated.

Figure 14:
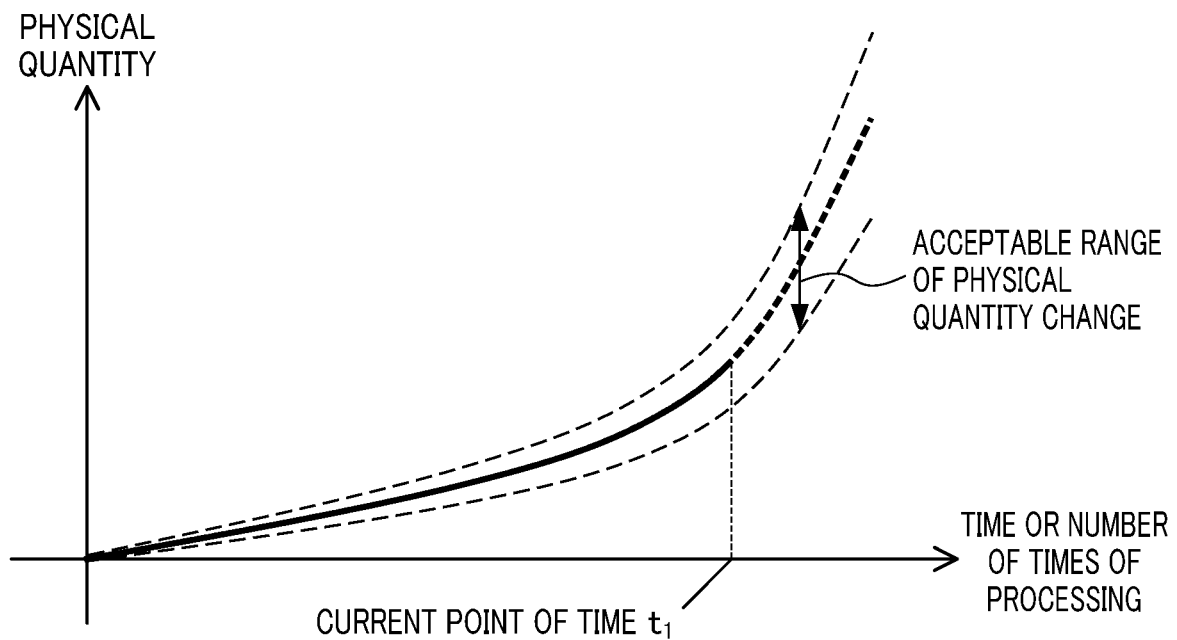
FIG. 14 is a graph showing one example of a change in an estimated physical quantity relating to the life of a component.

FIG. 14 is a graph showing one example of a change in the estimated physical quantity relating to the life of the component. The vertical axis of FIG. 14 indicates the physical quantity, and the horizontal axis indicates time or the number of times of processing.

As shown in FIG. 14, the estimated physical quantity relating to the life of the component as indicated by a solid line changes according to the component use time or the number of times of processing. Note that dashed lines indicate the acceptable range (e.g., −5% to +3%) of the physical quantity change with respect to the above-described estimated physical quantity. Moreover, a dashed line continued to the estimated physical quantity relating to the life of the component as indicated by the solid line indicates a subsequent estimated physical quantity change estimated based on the gradient of the estimated physical quantity at the current point of time $t_1$.

Figure 15:
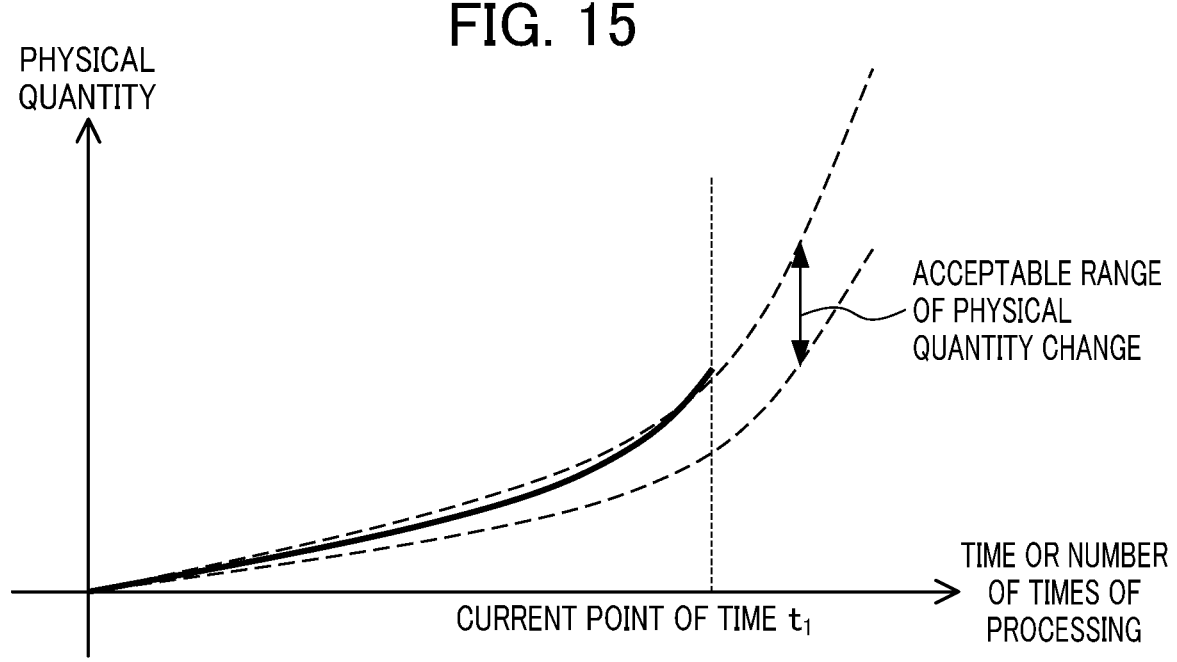
FIG. 15 is a graph showing one example in a case where the estimated physical quantity relating to the life of the component of the target machine exceeds the acceptable range of the physical quantity change.

As shown in FIG. 15, in a case where the estimated physical quantity relating to the life of the component of the target machine 200(1) exceeds the acceptable range of the physical quantity change, the diagnostic apparatus 100 may determine that the target machine 200(1) is anomalous, and may output a determination result to the notification unit 130 via the notification control unit 119. As shown in FIG. 15, in a case where the estimated physical quantity relating to the life of the component of the target machine 200(1) crosses, for example, the upper side of the acceptable range of the physical quantity change (the change is too great), the user of the diagnostic apparatus 100 may determine that there is the probability of deterioration/damage of the component of the target machine 200(1). In a case where the estimated physical quantity relating to the life of the component of the target machine 200(1) crosses the lower side of the acceptable range of the physical quantity change (the change is too small), the user of the diagnostic apparatus 100 may determine that there is the probability of the anomaly of the sensing unit 220 of the target machine 200(1) or a connection unit thereof (including a communication section).

With this configuration, an anomalous state in the target machine 200(1) can be promptly found.

Note that the diagnostic apparatus 100 may estimate the timing of maintenance and replacement of the component by means of the estimated physical quantity relating to the life of the component of the target machine 200(1).

Figure 16:
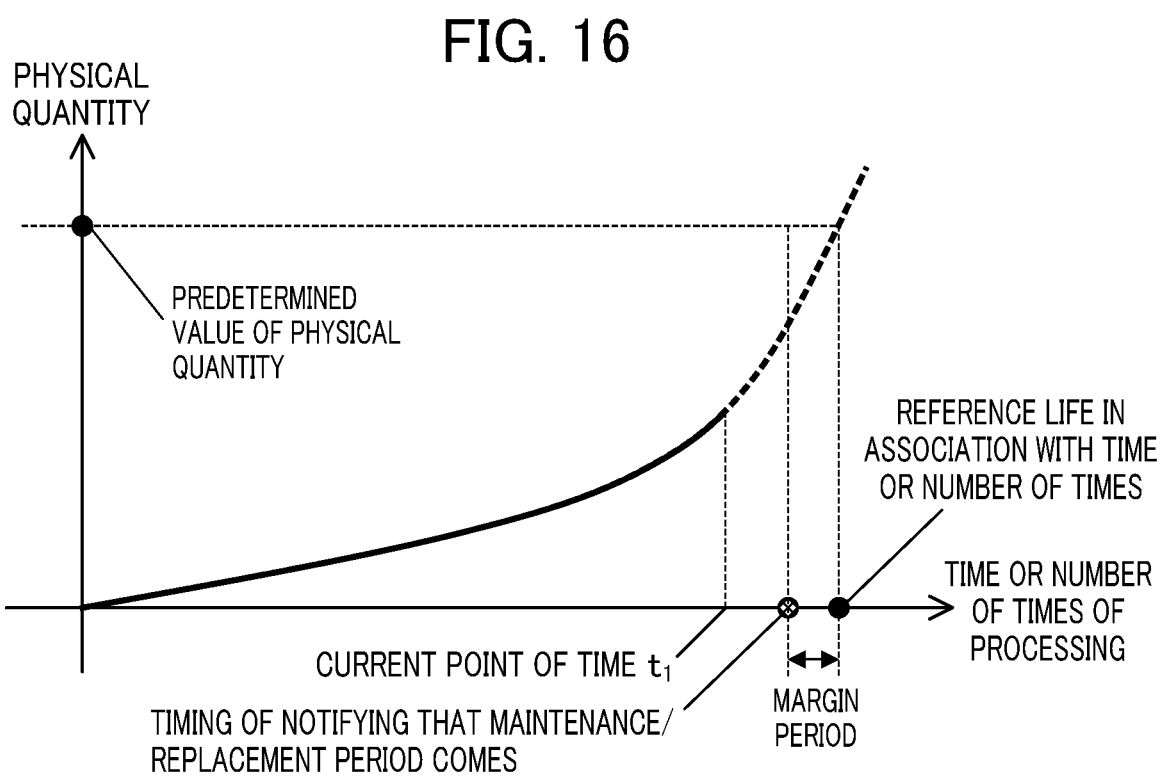
FIG. 16 is a graph for describing an example of estimation of component maintenance/replacement timing by means of the estimated physical quantity relating to the life of the component.

FIG. 16 is a graph for describing an example of estimation of the component maintenance/replacement timing by means of the estimated physical quantity relating to the life of the component. Note that in FIG. 16, operation of the target machine 200(1) is normal, and transition of the estimated physical quantity relating to the life of the component as indicated by a solid line is within the acceptable range of the physical quantity change.

Moreover, FIG. 16 shows a reference life (i.e., the maintenance/replacement timing) in association with the component use time or the number of times of use of the component and a predetermined value of the physical quantity corresponding to the reference life. The predetermined value of the physical quantity and the reference life in association with the time or the number of times may be determined based on an approximate life or an approximate number of times developed from, e.g., experiment at an experimental stage or performance verification of the mechanical apparatus 200. Alternatively, the predetermined value of the physical quantity and the reference life in association with the time or the number of times may be determined using a well-known life calculation expression (e.g., the basic rating life of the bearing or the load life of the ball screw) relating to the component. Moreover, the predetermined value of the physical quantity and the reference life in association with the time or the number of times may be stored in advance in the storage unit 115.

As shown in FIG. 16, in the diagnostic apparatus 100, a margin period for notifying that a maintenance/replacement period is approaching may be provided before a predetermined period before the reference life in association with the component use time of the target machine 200(1) or the number of times of use of the component of the target machine 200(1), for example. With this configuration, the user of the diagnostic apparatus 100 can set a maintenance day according to an operation/use status in the target machine 200(1). Moreover, the user of the diagnostic apparatus 100 can arrange maintenance schedule, and can perform maintenance before the target machine 200(1) is stopped due to the anomaly.

Note that the margin period may be set as necessary according to the target machine 200(1) by the user of the diagnostic apparatus 100. Moreover, the user of the diagnostic apparatus 100 may reset the feature information of the target machine 200(1) after maintenance and replacement.

Further, the margin period is provided for the diagnostic apparatus 100, but the present disclosure is not limited to such a configuration. A predetermined threshold for the estimated physical quantity relating to the life of the component may be provided, and in a case where the estimated physical quantity reaches the predetermined threshold, the diagnostic apparatus 100 may notify that the maintenance/replacement period is approaching.

In addition, the graphs shown in FIGS. 14 to 16 may be, via the notification unit 130, displayed on the not-shown display apparatus connected to the diagnostic apparatus 100 or the not-shown display apparatus provided in the control apparatus 210 of the mechanical apparatus 200, as necessary.

<Sixth Variation>

For example, in the above-described embodiment, the diagnostic apparatus 100 diagnoses the operation state of each mechanical apparatus 200 based on the sensing information and the context information acquired from each mechanical apparatus 200, but the present disclosure is not limited to such a configuration. For example, the diagnostic apparatus 100 may store, in the storage unit 115, layout information indicating arrangement of the mechanical apparatuses 200(1) to 200(n).

In this case, in a case where the optional mechanical apparatus 200 is, for example, selected using the layout information, the diagnostic apparatus 100 may display, with, e.g., a color corresponding to the level of influence, an element (the other mechanical apparatuses 200) providing influence to the selected mechanical apparatus (the target machine) 200 and an element (the other mechanical apparatuses 200) receiving influence from the selected mechanical apparatus (the target machine) 200 on the not-shown display apparatus connected to the diagnostic apparatus 100 or the not-shown display apparatus provided in the control apparatus 210 of the mechanical apparatus 200.

Figure 17:
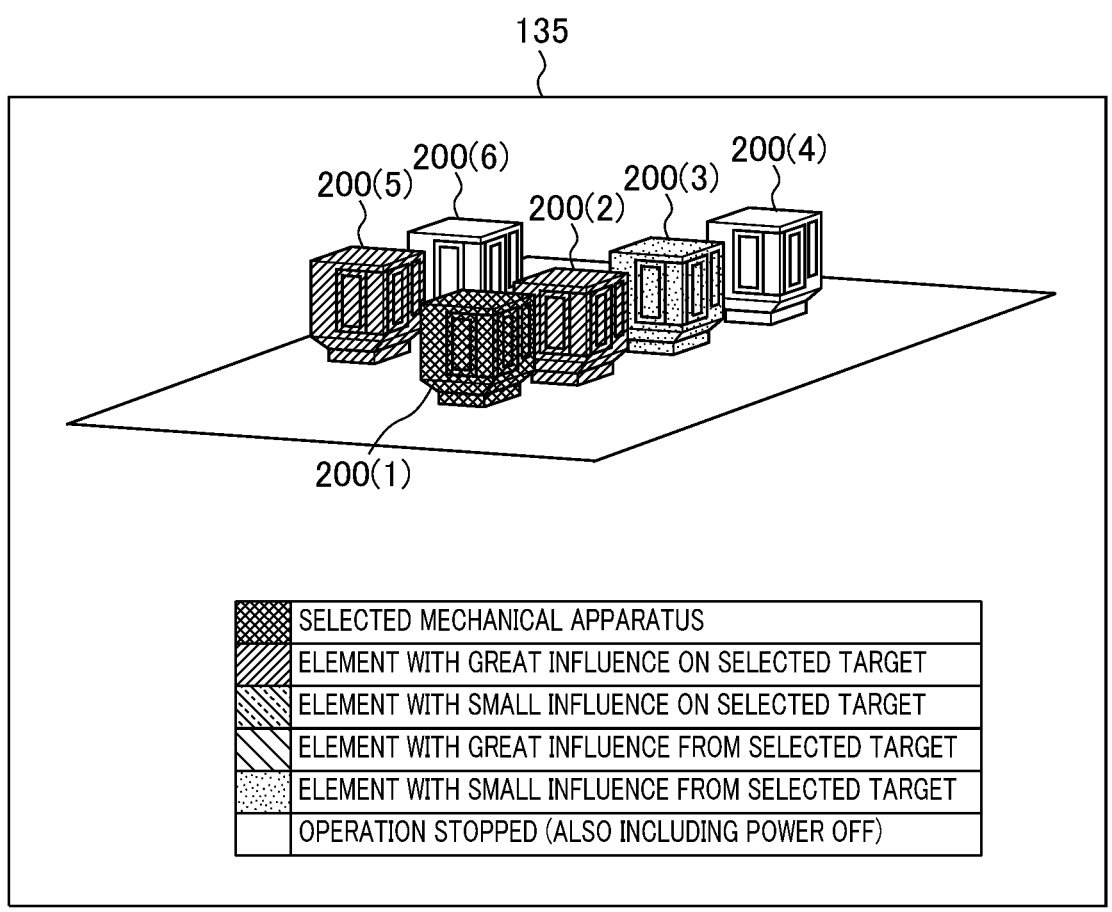
FIG. 17 is a view showing one example of a display screen showing arrangement of the selected mechanical apparatus and the other mechanical apparatuses with the levels of influence being indicated by colors.

FIG. 17 is a view showing one example of a display screen 135 showing arrangement of the selected mechanical apparatus 200 and the other mechanical apparatuses 200 with the levels of influence being indicated by the colors.

As shown in FIG. 17, the upper side of the display screen 135 shows layout in a case where there are six mechanical apparatuses 200 arranged in a building, for example. Moreover, the lower side of the display screen 135 shows color legends, and for example, pink, red, green, orange, yellow, and gray may be provided in this order from the top. Note that FIG. 17 shows the mechanical apparatus 200(1) as the selected mechanical apparatus (the target machine).

Note that the level of influence may be simply the level of physical quantity information, or may be the level of influence on an operation result of the target machine 200(1). For example, there is a probability that there is a difference in a yield ratio between the mechanical apparatus 200 for rough processing and the mechanical apparatus 200 for finishing even when these apparatuses receive the same vibration. That is, the influence on the mechanical apparatus 200 for rough processing is small, but the influence on the mechanical apparatus 200 for finishing is great.

Moreover, as shown in FIG. 17, only one optional target machine 200(1) is operated and influence on the other peripheral mechanical apparatuses 200(k) is examined. In this manner, the sensing information separation unit 113 can obtain the weighting coefficient of the target machine 200(1) with respect to the other mechanical apparatuses 200(2), 200(3), for example. In this case, the sensing information separation unit 113 may calculate, based on a well-known distance attenuation expression and the layout information in a case where a vibration or sound generation source is a point source, the weighting coefficient of the target machine 200(1) with respect to the mechanical apparatus 200(4) by means of the weighting coefficients and distances of the other mechanical apparatuses 200(2), 200(3). With this configuration, the physical quantity information of the mechanical apparatus 200(4) can be estimated even in a case where the mechanical apparatus 200(4) does not have the sensing unit 220, and the number of necessary sensing units 220 can be reduced.

Using the layout information, the diagnostic apparatus 100 may estimate, regardless of a small distance among the target machine 200(1) and the other mechanical apparatuses 200($k$) on the layout, that some sort of anomaly has been caused in, e.g., the sensing unit 220 of the target machine 200(1) or the sensing units 220 of the other mechanical apparatuses 200($k$) in a case where the weighting coefficient is extremely small.

The layout information may include information of an element that does not operate by the element itself, such as building information (e.g., floor strength, posts, the number of floors, and age). With this configuration, the diagnostic apparatus 100 can separate the sensing information and can enhance the accuracy of anomaly detection.

Note that all combinations (pairs) of the mechanical apparatuses 200 may be operated to examine influence of both apparatuses. In this case, the generation unit 116 may execute supervised learning by means of input data including the sensing information $f_1(t)$ of the optional target machine 200(1), the sensing information $f_k(t)$ of the other optional mechanical apparatuses 200($k$), and the distance between the optional target machine 200(1) and each of the other optional mechanical apparatuses 200($k$) in the layout information and label data indicating the coefficient $a_{1k}$ as the level of influence of operation of the other optional mechanical apparatuses 200($k$) on the sensing information of the optional target machine 200(1) and the coefficient $a_{k1}$ as the level of influence of operation of the optional target machine 200(1) on the sensing information of the other optional mechanical apparatuses 200($k$), thereby generating a learned model in advance.

Figure 18:
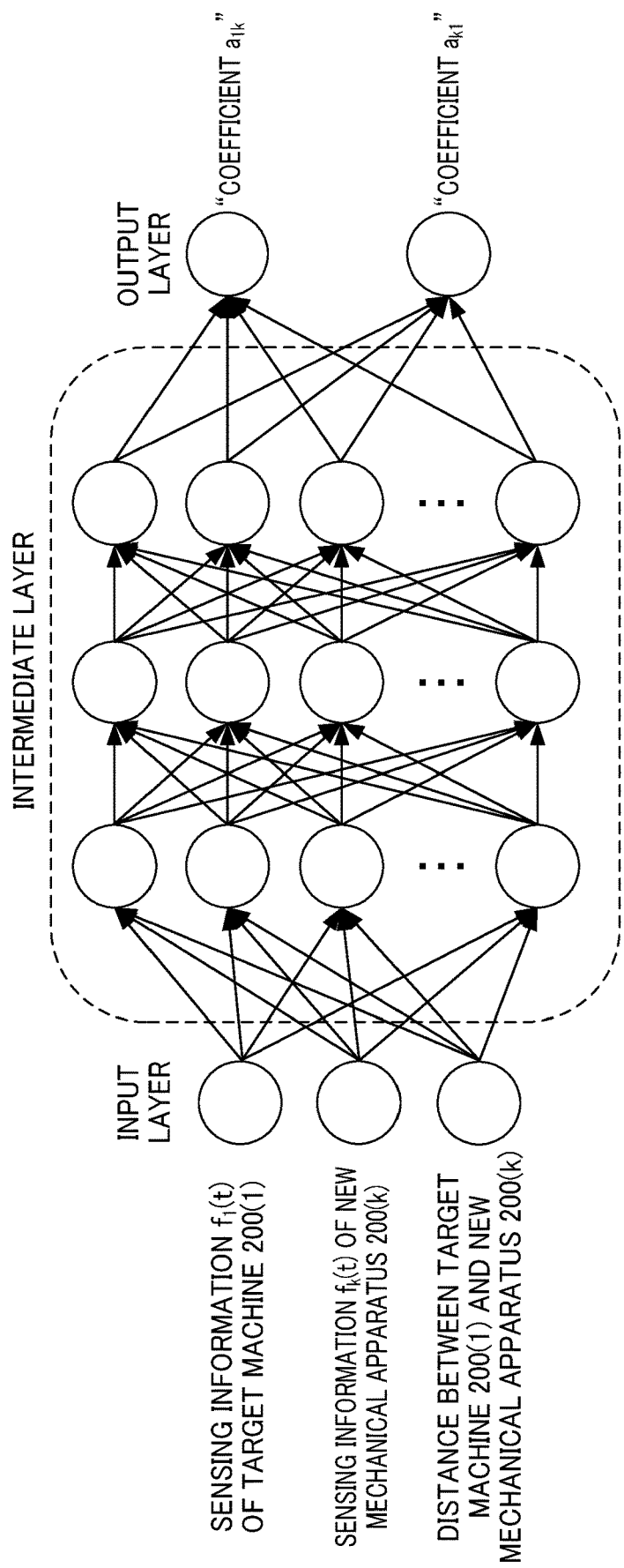
FIG. 18 is a diagram showing one example of a built learned model.

FIG. 18 is a diagram showing one example of the built learned model. As shown in FIG. 18, the learned model described herein is, as an example, a learned model (a multilayer neural network) having the sensing information $f_1(t)$ of the target machine 200(1), the sensing information $f_k(t)$ of the new mechanical apparatus 200($k$), and the distance between the target machine 200(1) and the new mechanical apparatus 200($k$) as an input layer and having data indicating the "COEFFICIENT $a_{1k}$" as the level of influence of operation of the new mechanical apparatus 200($k$) on the sensing information of the target machine 200(1) and the "COEFFICIENT $a_{k1}$" as the level of influence of operation of the target machine 200(1) on the sensing information of the new mechanical apparatus 200($k$) as an output layer.

Moreover, the sensing information separation unit 113 inputs the sensing information $f_1(t)$ of the target machine 200(1), the sensing information $f_k(t)$ of the new mechanical apparatus 200($k$) such as the newly-placed mechanical apparatus 200, and the distance between the target machine 200(1) and the new mechanical apparatus 200($k$) to the learned model of FIG. 18, thereby determining the coefficient $a_{1k}$ as the level of influence of the new mechanical apparatus 200($k$) on the sensing information $f_1(t)$ of the target machine 200(1) and the coefficient $a_{k1}$ as the level of influence of the target machine 200(1) on the sensing information $f_k(t)$ of the new mechanical apparatus 200($k$).

With this configuration, when the new mechanical apparatus 200($k$) is placed, the diagnostic apparatus 100 uses the learned model of FIG. 18 so that the weighting coefficients $a_{1k}$, $a_{k1}$ between the new mechanical apparatus 200($k$) and the existing target machine 200(1) can be obtained.

As described above, the learned model is applied so that only one optional mechanical apparatus 200 can be operated and the number of samples for examining influence on the peripheral mechanical apparatuses 200 and the number of steps of verifying such influence can be reduced.

Note that in a case where new training data is acquired after the learned model of FIG. 18 has been built, the generation unit 116 may further perform the supervised learning for the learned model of FIG. 18 to update the learned model built once.

Moreover, the generation unit 116 of the diagnostic apparatus 100 builds the learned model of FIG. 18, but an external machine learning apparatus may build the learned model of FIG. 18 to provide the built learned model to the diagnostic apparatus 100. In this case, the diagnostic apparatus 100 does not necessarily include the generation unit 116.

The supervised learning as described above may be performed by online learning, may be performed by batch learning, or may be performed by minibatch learning.

The online learning is a learning method that the supervised learning is promptly performed every time the training data is created. Moreover, the batch learning is a learning method that while the training data is being repeatedly created, a plurality of pieces of training data are collected in response to such repetition and the supervised learning is performed using all of the collected pieces of training data. Further, the minibatch learning is an intermediate learning method between the online learning and the batch learning, the supervised learning being performed every time a certain amount of training data is accumulated.

Note that each function included in the diagnostic apparatus 100 in one embodiment can be implemented by hardware, software, or a combination thereof. Implementation by the software as described herein means that each function is implemented by reading and execution of a program by a computer.

The program can be stored using various types of non-transitory computer readable media, and can be supplied to the computer. The non-transitory computer readable media include various types of tangible storage media. Examples of the non-transitory computer readable media include magnetic recording media (e.g., a flexible disk, a magnetic tape, and a hard disk drive), magnetic optical recording media (e.g., an magnetic optical disk), a CD read only memory (CD-ROM), a CD-R, a CD-R/W, and semiconductor memories (e.g., a mask ROM, a programmable ROM (PROM), an erasable PROM (EPROM), a flash ROM, and a RAM). The program may be supplied to the computer via various types of transitory computer readable media. Examples of the transitory computer readable media include an electric signal, an optical signal, and an electromagnetic wave. The transitory computer readable medium can supply the program to the computer via a wired communication path such as an electric wire or an optical fiber or via a wireless communication path.

Note that the step of describing the program stored in the recording medium includes, needless to say, not only processing performed in chronological order but also processing not necessarily performed in chronological order but executed in parallel or individually.

In other words, the diagnostic apparatus and the diagnostic method of the present disclosure can be implemented as various embodiments having the following embodiments.

(1) The diagnostic apparatus 100 of the present disclosure is a diagnostic apparatus connected to a plurality of mechanical apparatuses 200 including an industrial apparatus and a peripheral apparatus. The diagnostic apparatus 100 includes a context information acquisition unit 111 that acquires, from each of the plurality of mechanical apparatuses 200, context information corresponding to operation being performed among a plurality of pieces of context information set based on the type of operation of each of the plurality of mechanical apparatuses 200; a sensing information acquisition unit 112 that acquires, as sensing information sensed by sensing units 220 arranged in a target machine 200(1) as a mechanical apparatus targeted for diagnosis and other mechanical apparatuses 200(k), a physical quantity of each of the target machine 200(1) and the other mechanical apparatuses 200(k), the physical quantity changing according to operation of each of the target machine 200(1) and the other mechanical apparatuses 200(k); a sensing information separation unit 113 that separates physical quantity information indicating the physical quantity of the target machine 200(1) and physical quantity information indicating the physical quantities of the other mechanical apparatuses 200(k) from each other based on the context information of each of the plurality of mechanical apparatuses 200 acquired by the context information acquisition unit 111 and the sensing information of each of the target machine 200(1) and the other mechanical apparatuses 200(k) acquired by the sensing information acquisition unit 112; a feature information extraction unit 114 that extracts feature information indicating the feature of the physical quantity information in an interval including a specific operation interval indicated by the context information of the target machine 200(1) from the physical quantity information of the target machine 200(1) separated by the sensing information separation unit 113; and an anomaly determination unit 117 that determines, based on a model corresponding to the context information acquired by the context information acquisition unit 111 among one or more models corresponding to one or more pieces of context information and the feature information extracted by the feature information extraction unit 114, whether or not operation of the target machine 200(1) is normal.

According to the diagnostic apparatus 100, the physical quantity sensing information detected by the sensing unit of the target machine is separated into the physical quantity from the target machine itself and the physical quantities from the other mechanical apparatuses so that an anomaly in the target machine 200(1) can be sensed with high accuracy.

(2) In the diagnostic apparatus 100 according to (1), the feature information extraction unit 114 may include a feature extraction unit 1141 that extracts the feature information from the physical quantity information of the target machine 200(1) separated by the sensing information separation unit 113, a selection unit 1142 that selects reference feature information as a reference based on the feature information, and sequentially selects target feature information for comparison with the reference feature information, a calculation unit 1143 that calculates processing interval likelihood of processing of the target machine 200(1) from comparison between the reference feature information selected by the selection unit 1142 and the target feature information, an interval determination unit 1144 that determines, based on the processing interval likelihood, whether or not the target feature information corresponding to the processing interval likelihood is included in a processing interval of the processing, and an estimation unit 1145 that estimates the processing interval based on a determination result of the interval determination unit 1144.

With this configuration, the feature information in the processing interval of the target machine 200(1) can be accurately extracted from the physical quantity information of the target machine 200(1).

(3) In the diagnostic apparatus 100 according to (2), based on the operation interval, the selection unit 1142 may select, as the reference feature information, the feature information in an interval determinable as a non-processing interval that is not the processing interval.

With this configuration, the feature information in the processing interval of the target machine 200(1) can be accurately extracted.

(4) In the diagnostic apparatus 100 according to (2), the selection unit 1142 may average a predetermined number of pieces of previous information selected as the reference feature information, and selects the averaged information as new reference feature information.

With this configuration, influence of, e.g., noise that might be included in the selected reference feature information can be reduced.

(5) In the diagnostic apparatus 100 according to (2), the selection unit 1142 may select, as the reference feature information, information generated by machine learning for the feature information.

With this configuration, the feature information in the processing interval of the target machine 200(1) can be accurately extracted.

(6) In the diagnostic apparatus 100 according to any one of (2) to (5), the feature extraction unit 1141 may extract, as the feature information, the frequency spectrum of the physical quantity information in the interval including the operation interval, and the calculation unit 1143 may calculate the processing interval likelihood based on a difference between a frequency spectrum as the reference feature information and a frequency spectrum as the target feature information.

With this configuration, the feature information in the processing interval of the target machine 200(1) can be accurately extracted.

(7) In the diagnostic apparatus 100 according to any one of (2) to (6), in a case where the processing interval likelihood is greater than a predetermined threshold, the interval determination unit 1144 may determine that the target feature information corresponding to the processing interval likelihood is included in the processing interval.

With this configuration, the feature information in the processing interval of the target machine 200(1) can be accurately extracted.

(8) The diagnostic apparatus 100 according to any one of (2) to (7) may further include a generation unit 116 that generates a model from the feature information corresponding to the processing interval estimated by the estimation unit 1145 in the feature information corresponding to the context information acquired by the context information acquisition unit 111.

With this configuration, it can be accurately determined whether or not operation of the target machine 200(1) is normal.

(9) In the diagnostic apparatus 100 according to any one of (1) to (8), the sensing information acquisition unit 112 may acquire the sensing information sensed by the sensing unit 220 in the target machine 200(1) in a state in which power is distributed and no processing is performed and the sensing information sensed by the sensing unit 220 in a state in which the processing is performed. The sensing information separation unit 113 may compare the sensing information in the state in which no processing is performed in the target machine 200(1) and the sensing information in the state in which the processing is performed, separate the physical quantity information due to the processing and the physical quantity information not due to the processing, and output, as the physical quantity information of the target machine 200(1), the physical quantity information due to the processing to the feature information extraction unit 114.

With this configuration, it can be accurately determined whether or not operation of the target machine 200(1) is normal.

(10) In the diagnostic apparatus 100 according to any one of (1) to (9), the sensing information separation unit 113 may determine, for separating the physical quantity information of the target machine 200(1) and the physical quantity information of the other mechanical apparatuses 200(k), at least a weighting coefficient indicating the level of influence of operation of the other mechanical apparatuses 200(k) on the target machine 200(1).

With this configuration, the physical quantity information of the target machine 200(1) and the physical quantity information of the other mechanical apparatuses 200(k) can be separated from each other.

(11) In the diagnostic apparatus 100 according to (10), the sensing information separation unit 113 may determine, based on layout information indicating arrangement of the plurality of mechanical apparatuses 200, the weighting coefficient indicating the level of influence of the other mechanical apparatuses 200(k) on the target machine 200(1).

With this configuration, the physical quantity information of the other mechanical apparatuses 200(k) can be estimated even in a case where the other mechanical apparatuses 200(k) include no sensing units 220, and the number of necessary sensing units 220 can be reduced.

(12) In the diagnostic apparatus 100 according to (11), the layout information may include building information.

With this configuration, the sensing information can be separated, and anomaly detection accuracy can be enhanced.

(13) In the diagnostic apparatus 100 according to any one of (1) to (12), the sensing information acquisition unit 112 may acquire physical quantity information of a building by the sensing unit 220 arranged in the target machine 200(1).

With this configuration, the number of necessary sensing units 220 can be reduced.

(14) The diagnostic apparatus 100 according to any one of (1) to (13) may further include an operation restriction command output unit 118 that restricts operation of the other mechanical apparatuses 200(k) in a case where the percentage of the physical quantity information of the other mechanical apparatuses 200(k) in the sensing information of the target machine 200(1) is equal to or greater than an acceptable predetermined value.

With this configuration, processing accuracy in the target machine 200(1) can be maintained.

(15) In the diagnostic apparatus 100 according to any one of (1) to (14), the sensing information acquisition unit 112 may acquire the sensing information sensed by a non-contact sensing unit 220 arranged in at least one of the mechanical apparatuses 200 and changing the position and direction of sensing of the physical quantity by movement of the at least one of the mechanical apparatuses 200.

With this configuration, the physical quantity at such a location that a contact sensing unit 220 cannot be arranged can be also sensed.

(16) In the diagnostic apparatus 100 according to (15), the contact sensing unit 220 arranged in the target machine 200(1) and the non-contact sensing unit 220 may simultaneously perform sensing upon sensing of the physical quantity at a specific location.

With this configuration, operation of each sensing unit 220 can be checked.

(17) A diagnostic method of the present disclosure is the diagnostic method for diagnosing a plurality of mechanical apparatuses 200 including an industrial apparatus and a peripheral apparatus. The diagnostic method is realized by a computer and includes the context information acquisition step of acquiring, from each of the plurality of mechanical apparatuses 200, context information corresponding to operation being performed among a plurality of pieces of context information set based on the type of operation of each of the plurality of mechanical apparatuses 200; the sensing information acquisition step of acquiring, as sensing information sensed by sensing units 220 arranged in a target machine 200(1) as a mechanical apparatus targeted for diagnosis and other mechanical apparatuses 200(k), a physical quantity of each of the target machine 200(1) and the other mechanical apparatuses 200(k), the physical quantity changing according to operation of each of the target machine 200(1) and the other mechanical apparatuses 200(k); the sensing information separation step of separating physical quantity information indicating the physical quantity of the target machine 200(1) and physical quantity information indicating the physical quantities of the other mechanical apparatuses 200(k) from each other based on the context information of each of the plurality of mechanical apparatuses 200 acquired at the context information acquisition step and the sensing information of each of the target machine 200(1) and the other mechanical apparatuses 200(k) acquired at the sensing information acquisition step; the feature information extraction step of extracting feature information indicating the feature of the physical quantity information in an interval including a specific operation interval indicated by the context information of the target machine 200(1) from the physical quantity information of the target machine 200(1) separated at the sensing information separation step; and the anomaly determination step of determining, based on a model corresponding to the context information acquired at the context information acquisition step among one or more models corresponding to one or more pieces of context information and the feature information extracted at the feature information extraction step, whether or not operation of the target machine 200(1) is normal.

According to this diagnostic method, advantageous effects similar to those of (1) can be provided.

EXPLANATION OF REFERENCE NUMERALS 1 diagnostic system
100 diagnostic apparatus
111 context information acquisition unit
112 sensing information acquisition unit
113 sensing information separation unit
114 feature information extraction unit
1141 feature extraction unit
1142 selection unit
1143 calculation unit
1144 interval determination unit 1145 estimation unit
116 generation unit
117 anomaly determination unit
118 operation restriction command output unit
200(1) to 200(n) mechanical apparatus
210 control apparatus
220 sensing unit

What is claimed is:

1. A diagnostic apparatus connected to a plurality of mechanical apparatuses including an industrial apparatus and a peripheral apparatus, comprising:
   a context information acquisition unit that acquires, from each of the plurality of mechanical apparatuses, context information corresponding to operation being performed among a plurality of pieces of context information set based on a type of operation of each of the plurality of mechanical apparatuses;
   a sensing information acquisition unit that acquires, as sensing information sensed by sensing units arranged in a target machine as a mechanical apparatus targeted for diagnosis and other mechanical apparatuses, a physical quantity of each of the target machine and the other mechanical apparatuses, the physical quantity changing according to operation of each of the target machine and the other mechanical apparatuses;
   a sensing information separation unit that separates physical quantity information indicating the physical quantity of the target machine and physical quantity information indicating the physical quantities of the other mechanical apparatuses from each other based on the context information of each of the plurality of mechanical apparatuses acquired by the context information acquisition unit and the sensing information of each of the target machine and the other mechanical apparatuses acquired by the sensing information acquisition unit;
   a feature information extraction unit that extracts feature information indicating a feature of the physical quantity information in an interval including a specific operation interval indicated by the context information of the target machine from the physical quantity information of the target machine separated by the sensing information separation unit; and
   an anomaly determination unit that determines, based on a model corresponding to the context information acquired by the context information acquisition unit among one or more models corresponding to one or more pieces of context information and the feature information extracted by the feature information extraction unit, whether or not the operation of the target machine is normal.

2. The diagnostic apparatus according to claim 1, wherein the feature information extraction unit includes
   a feature extraction unit that extracts the feature information from the physical quantity information of the target machine separated by the sensing information separation unit,
   a selection unit that selects reference feature information as a reference based on the feature information, and sequentially selects target feature information for comparison with the reference feature information,
   a calculation unit that calculates a processing interval likelihood of processing of the target machine from comparison between the reference feature information selected by the selection unit and the target feature information,
   an interval determination unit that determines, based on the processing interval likelihood, whether or not the target feature information corresponding to the processing interval likelihood is included in a processing interval of the processing, and
   an estimation unit that estimates the processing interval based on a determination result of the interval determination unit.

3. The diagnostic apparatus according to claim 2, wherein based on the operation interval, the selection unit selects, as the reference feature information, the feature information in an interval determinable as a non-processing interval that is not the processing interval.

4. The diagnostic apparatus according to claim 2, wherein the selection unit averages a predetermined number of pieces of previous information selected as the reference feature information, and selects the averaged information as new reference feature information.

5. The diagnostic apparatus according to claim 2, wherein the selection unit selects, as the reference feature information, information generated by machine learning for the feature information.

6. The diagnostic apparatus according to claim 2, wherein
   the feature extraction unit extracts, as the feature information, a frequency spectrum of the physical quantity information in the interval including the operation interval, and
   the calculation unit calculates the processing interval likelihood based on a difference between a frequency spectrum as the reference feature information and a frequency spectrum as the target feature information.

7. The diagnostic apparatus according to claim 2, wherein in a case where the processing interval likelihood is greater than a predetermined threshold, the interval determination unit determines that the target feature information corresponding to the processing interval likelihood is included in the processing interval.

8. The diagnostic apparatus according to claim 2, further comprising: a generation unit that generates a model from the feature information corresponding to the processing interval estimated by the estimation unit in the feature information corresponding to the context information acquired by the context information acquisition unit.

9. The diagnostic apparatus according to claim 1, wherein
   the sensing information acquisition unit acquires the sensing information sensed by the sensing unit in the target machine in a state in which power is distributed and no processing is performed and the sensing information sensed by the sensing unit in a state in which the processing is performed, and
   the sensing information separation unit compares the sensing information in the state in which no processing is performed in the target machine and the sensing information in the state in which the processing is performed, separates the physical quantity information due to the processing and the physical quantity information not due to the processing, and outputs, as the physical quantity information of the target machine, the physical quantity information due to the processing to the feature information extraction unit.

10. The diagnostic apparatus according to claim 1, wherein the sensing information separation unit determines, for separating the physical quantity information of the target machine and the physical quantity information of the other mechanical apparatuses, at least a weighting coefficient indicating a level of influence of the operation of the other mechanical apparatuses on the target machine.

11. The diagnostic apparatus according to claim 10, wherein the sensing information separation unit determines, based on layout information indicating arrangement of the plurality of mechanical apparatuses, the weighting coefficient indicating the level of influence of the other mechanical apparatuses on the target machine.

12. The diagnostic apparatus according to claim 11, wherein the layout information includes building information.

13. The diagnostic apparatus according to claim 1, wherein the sensing information acquisition unit acquires physical quantity information of a building by the sensing unit arranged in the target machine.

14. The diagnostic apparatus according to claim 1, further comprising: an operation restriction command output unit that restricts the operation of the other mechanical apparatuses in a case where a percentage of the physical quantity information of the other mechanical apparatuses in the sensing information of the target machine is equal to or greater than an acceptable predetermined value.

15. The diagnostic apparatus according to claim 1, wherein the sensing information acquisition unit acquires the sensing information sensed by a non-contact sensing unit arranged in at least one of the mechanical apparatuses and changing a position and a direction of sensing of the physical quantity by movement of the at least one of the mechanical apparatuses.

16. The diagnostic apparatus according to claim 15, wherein a contact sensing unit arranged in the target machine and the non-contact sensing unit simultaneously perform sensing upon sensing of the physical quantity at a specific location.

17. A diagnostic method for diagnosing a plurality of mechanical apparatuses including an industrial apparatus, the method being realized by a computer and comprising:
   a context information acquisition step of acquiring, from each of the plurality of mechanical apparatuses, context information corresponding to operation being performed among a plurality of pieces of context information set based on a type of operation of each of the plurality of mechanical apparatuses;
   a sensing information acquisition step of acquiring, as sensing information sensed by sensing units arranged in a target machine as a mechanical apparatus targeted for diagnosis and other mechanical apparatuses, a physical quantity of each of the target machine and the other mechanical apparatuses, the physical quantity changing according to operation of each of the target machine and the other mechanical apparatuses;
   a sensing information separation step of separating physical quantity information indicating the physical quantity of the target machine and physical quantity information indicating the physical quantities of the other mechanical apparatuses from each other based on the context information of each of the plurality of mechanical apparatuses acquired at the context information acquisition step and the sensing information of each of the target machine and the other mechanical apparatuses acquired at the sensing information acquisition step;
   a feature information extraction step of extracting feature information indicating a feature of the physical quantity information in an interval including a specific operation interval indicated by the context information of the target machine from the physical quantity information of the target machine separated at the sensing information separation step; and
   an anomaly determination step of determining, based on a model corresponding to the context information acquired at the context information acquisition step among one or more models corresponding to one or more pieces of context information and the feature information extracted at the feature information extraction step, whether or not the operation of the target machine is normal.

* * * * *